United States Patent
Suwa et al.

(10) Patent No.: US 7,042,275 B2
(45) Date of Patent: May 9, 2006

(54) BOOSTER CIRCUIT

(75) Inventors: Hitoshi Suwa, Osaka (JP); Yukimasa Hamamoto, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 36 days.

(21) Appl. No.: 10/783,025

(22) Filed: Feb. 23, 2004

(65) Prior Publication Data

US 2005/0024126 A1  Feb. 3, 2005

(30) Foreign Application Priority Data

Mar. 7, 2003 (JP) ............................ 2003-061219

(51) Int. Cl.
*H02M 3/15* (2006.01)
*G05F 3/02* (2006.01)

(52) U.S. Cl. .................. 327/536; 327/537; 363/60

(58) Field of Classification Search .............. None
See application file for complete search history.

(56) References Cited

U.S. PATENT DOCUMENTS

| | | | | |
|---|---|---|---|---|
| 5,563,779 A | * | 10/1996 | Cave et al. | .............. 363/59 |
| 5,754,075 A | * | 5/1998 | Oh et al. | .............. 327/536 |
| 6,002,599 A | * | 12/1999 | Chow | .............. 363/59 |
| 6,188,590 B1 | * | 2/2001 | Chang et al. | .............. 363/60 |
| 6,414,862 B1 | * | 7/2002 | Ogura | .............. 363/60 |
| 6,734,718 B1 | * | 5/2004 | Pan | .............. 327/536 |

FOREIGN PATENT DOCUMENTS

JP           4-132088           5/1992

* cited by examiner

*Primary Examiner*—Timothy P. Callahan
*Assistant Examiner*—Terry L. Englund
(74) *Attorney, Agent, or Firm*—Mdermott Will & Emery LLP

(57) ABSTRACT

Each boosting cell includes: a first n-transistor having a diode connection; a second n-transistor whose gate and drain are connected to a power supply voltage and whose source is connected to the source of the first n-transistor; and a boosting capacitor provided between the drain of the first n-transistor and a boosting clock input terminal to which a clock signal is input. The boosting capacitor is connected to n auxiliary boosting capacitors in parallel via connection switching circuits controlled with boosting ability switching signals as control signals input from the outside.

1 Claim, 21 Drawing Sheets

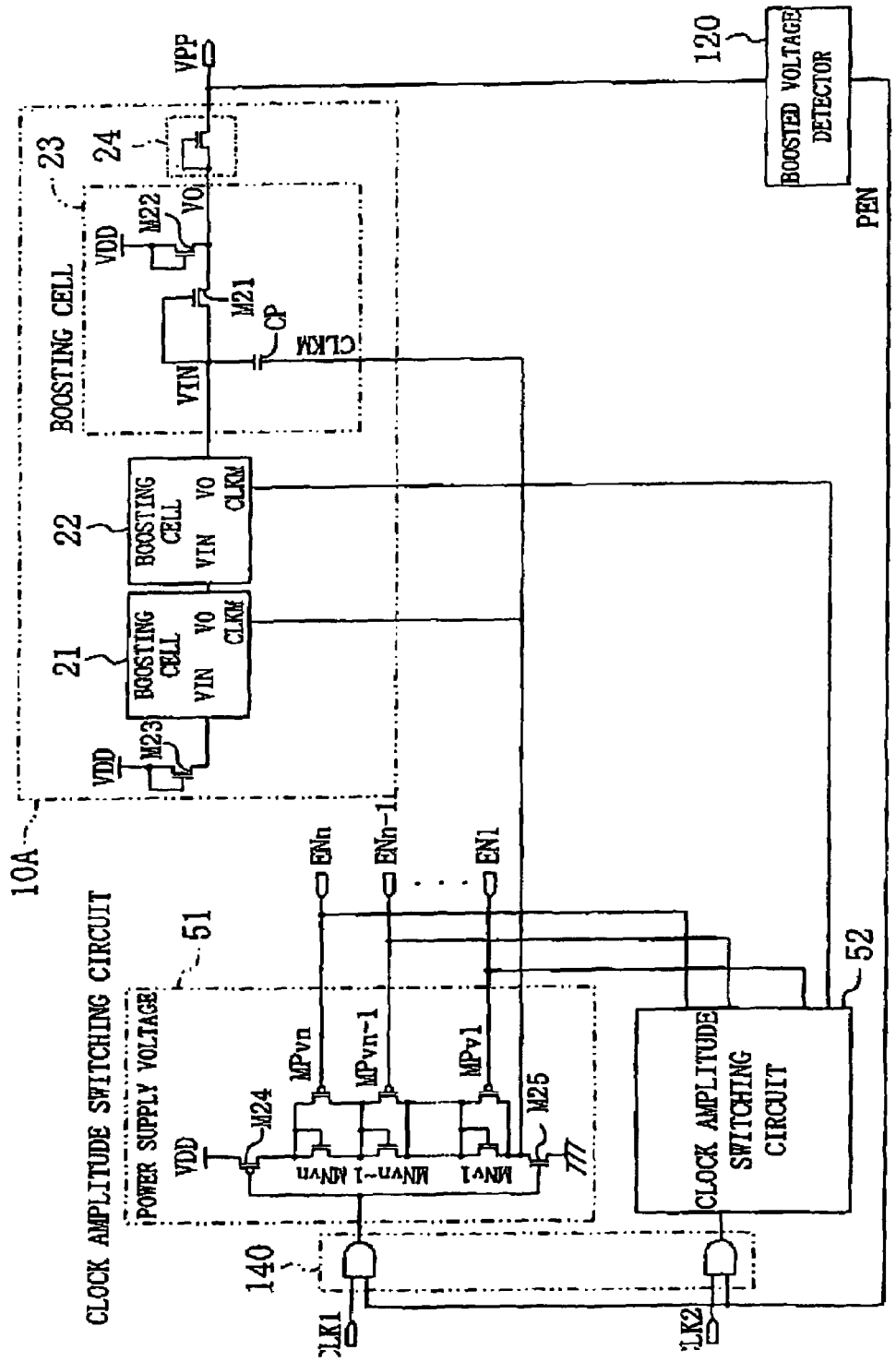

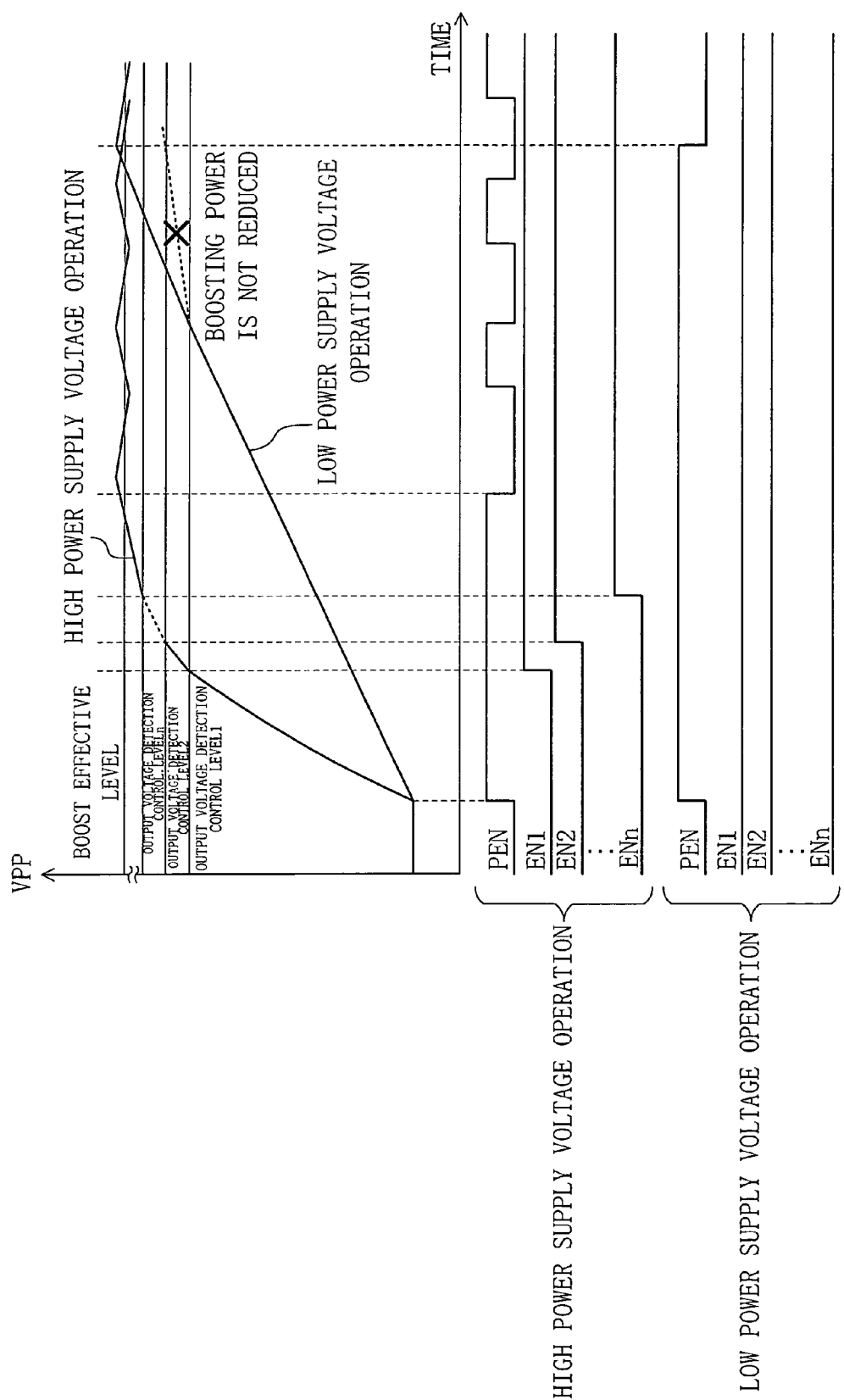

US 7,042,275 B2

BOOSTER CIRCUIT

BACKGROUND OF THE INVENTION

The present invention relates to booster circuits for use in semiconductor integrated circuit devices such as nonvolatile semiconductor memories.

A booster circuit that compares an increased output potential (boosted potential) with a reference potential to control the upper limit of the boosted potential has been conventionally used to prevent the breakdown of a transistor provided to determine the upper limit of the boosted potential in a high-voltage supplying circuit for erasing and writing in a nonvolatile semiconductor memory, for example, (e.g., in Japanese Laid-Open Publication No. 4-132088).

FIG. 20 shows an example of a configuration of a conventional booster circuit disclosed in the above publication.

As shown in FIG. 20, each of n pumping circuits 81₁ through 81n (where n is an integer of one or more) includes: first and second nMOS transistors MN1 and MN2 which are connected in series and each of which has its gate and drain connected to each other; and first and second pumping capacitances C1 and C2 whose electrodes at one side are connected to the gates of the respective transistors MN1 and MN2 and whose electrodes at the other side receive pumping control signals Tc and Bc which are complementary signals output from a pumping control signal generator 860.

The pumping circuit 81₁ at the initial stage is connected to a power supply terminal Vcc in a forward direction via a power supply transistor NTr81 made of an nMOS transistor whose gate and drain are connected. The output terminal of the pumping circuit 81n at the final stage is connected to the source of a pull-up nMOS transistor NTr82 whose gate and drain are connected to a power supply terminal Vcc to allow a boosted potential (output potential) VPUMP to be taken out. The output terminal of the pumping circuit 81n is also connected to an input terminal of a boosted potential sensor 820.

The boosted potential sensor 820 receives the boosted potential VPUMP at its input terminal and outputs a comparison output potential VPUMPC from its output terminal to a non-inverted input terminal of a comparison amplifier 830.

The comparison amplifier 830 is a differential amplifier which receives a reference potential VREF from a reference potential generator 840 at its non-inverted input terminal, compares the comparison output potential VPUMPC from the boosted potential sensor 820 with the reference potential VREF from the reference potential generator 840, and outputs the comparison result to the pumping control signal generator 860.

Hereinafter, it will be described how the booster circuit having the aforementioned configuration operates.

The booster circuit shown in FIG. 20 drives the potentials of the first and second pumping capacitances C1 and C2 constituting each of the pumping circuits 81₁ through 81n at high and low levels each in alternation with the other using the complementary clock signals Tc and Bc generated by the pumping control signal generator 860. Accordingly, a potential $(V_{CC}-V_{TH}+\Delta V)$ obtained by adding a boosted potential difference $\Delta V$ determined by the number n of stages to a potential $(V_{CC}-V_{TH})$ supplied via the power supply transistor NTr81 having a threshold voltage $V_{TH}$ is obtained as the output potential VPUMP of the booster circuit.

The comparison amplifier 830 continues boosting operation during a period in which the reference potential VREF is higher than or equal to the comparison output potential VPUMPC, i.e., VREF≧VPUMPC, while stopping the boosting operation during a period in which the reference potential VREF is lower than the comparison output potential VPUMPC, i.e., VREF<VPUMPC.

As another conventional example, a technique of controlling the output potential by making the pulse width of a pumping pulse variable depending on the value of the output potential (boosted potential) has been proposed.

However, in the booster circuit shown in FIG. 20, overshoot or undershoot occurs in the output potential with respect to a given boosted potential, i.e., a target value, as shown in FIG. 21, so that it is difficult to control the boosted output potential. This is because the booster circuit is switched between boosting operation and boosting suspension in accordance with the output potential, so that a sense delay and other factors cause a delay in determining the output potential.

The conventional boosting technique for controlling the pumping pulse width has another problem of large circuit scale and a large amount of power consumption in a control circuit for controlling the pulse width. This problem arises because the pulse-width control circuit controls the pulse width by generating an intermediate potential in accordance with the output value of the boosted potential and inputting the intermediate potential to a pulse generator.

SUMMARY OF THE INVENTION

It is therefore an object of the present invention to reduce variation of an output potential with respect to a given boosted potential while achieving control with a simple circuit configuration.

In order to achieve this object, a first booster circuit according to the present invention includes a boosting section including one or a plurality of serially-connected boosting cells for boosting an input voltage in response to a clock signal and outputting the boosted voltage, each of the boosting cells including a charge transfer transistor and a plurality of boosting capacitors connected in parallel; a boosted voltage detector for detecting the boosted voltage output from the boosting section and, when the detected boosted voltage is lower than or equal to a given voltage value, outputting a detection signal; and a clock generator for outputting the clock signal in response to the detection signal, wherein the boosting section includes a connection switching circuit for switching connections to the plurality of boosting capacitors based on the control signal.

In the first booster circuit, the number of boosting capacitors to be operated in a boosting cell is adjusted in accordance with a control signal from the outside, for example, so that the boosting ability of the boosting section is adjusted, thus preventing overshoot with respect to a target voltage which has been set. As a result, the reliability of components constituting the booster circuit is enhanced and, in addition, current consumption is reduced.

A second booster circuit according to the present invention includes: a clock amplitude switching section for changing the amplitude of a first clock signal to switch to a second clock signal and outputting the second clock signal, based on a control signal; a boosting section including one or a plurality of serially-connected boosting cells for boosting an input voltage in response to the second clock signal and outputting the boosted voltage, each of the boosting cells including a charge transfer transistor and a boosting capacitor; a boosted voltage detector for detecting the boosted voltage output from the boosting section and, when the detected boosted voltage is lower than or equal to a given voltage value, outputting a detection signal; and a clock generator for outputting the first clock signal in response to the detection signal.

In the second booster circuit, the amplitude of the second clock signal is made smaller than that of the first clock signal, so that the boosting ability of the boosting cell is adjusted, thus preventing overshoot with respect to a target voltage which has been set. As a result, the reliability of components constituting the booster circuit is enhanced and, in addition, it is possible to prevent the boosting section from exceeding the breakdown voltage.

A third booster circuit includes: a boosting section including one or a plurality of serially-connected boosting cells, each of the boosting cells including a plurality of charge transfer transistors connected in parallel, each receiving an output voltage from one of the transistors at a previous stage and outputting the received voltage to one of the transistors at a subsequent stage and an output-voltage capacitor having an electrode connected to output terminals of the charge transfer transistors and another electrode to which a first clock signal is input; a boosted voltage detector for detecting the boosted voltage output from the boosting section and, when the detected boosted voltage is lower than or equal to a given voltage value, outputting a detection signal; and a clock generator for outputting the first clock signal and a second clock signal having a phase different from that of the first clock signal, in response to the detection signal, wherein the boosting section includes a plurality of gate boosting capacitors each having an electrode connected to a gate of an associated one of the charge transfer transistors and another electrode to which the second clock signal is input, a charge-transfer-transistor control circuit connected to the gate boosting capacitors and used for selectively operating the charge transfer transistors based on the control signal, and a plurality of switching transistors for establishing an electrical connection or disconnection between an input terminal and a gate of each of the charge transfer transistors.

In the third booster circuit, the number of charge transfer transistors to be operated in a boosting cell is adjusted in accordance with a control signal, so that the boosting ability of the boosting section is adjusted, thus preventing overshoot with respect to a target voltage which has been set. As a result, the reliability of components constituting the booster circuit is enhanced and, in addition, the peak value of power supply current in operation of the boosting section is reduced.

A fourth booster circuit according to the present invention includes: a boosting section including one or a plurality of serially-connected boosting cells, each of the boosting cells including a plurality of charge transfer transistors connected in parallel, each receiving an output voltage from one of the transistors at a previous stage and outputting the received voltage to one of the transistors at a subsequent stage and an output-voltage capacitor having an electrode connected to output terminals of the charge transfer transistors and another electrode to which a first clock signal is input; a boosted voltage detector for detecting the boosted voltage output from the boosting section and, when the detected boosted voltage is lower than or equal to a given voltage value, outputting a detection signal; and a clock generator for outputting the first clock signal and a second clock signal having a phase different from that of the first clock signal, in response to the detection signal, wherein the boosting section includes a plurality of gate boosting capacitors each having an electrode connected to a gate of an associated one of the charge transfer transistors and another electrode to which the second clock signal is input, a charge-transfer-transistor shift control circuit connected to the gate boosting capacitors and used for operating the charge transfer transistors with the number of operating transistors changed, and a plurality of switching transistors for establishing an electrical connection or disconnection between an input terminal and a gate of each of the charge transfer transistors.

In the fourth booster circuit, delays are applied to the plurality of charge transfer transistors to gradually increase the number of operating charge transfer transistors. Accordingly, even with such a simple circuit configuration, the peak value of power supply current in operation of the boosting section is reduced.

The first through third booster circuits preferably further include a boosted voltage detection control section for detecting the output voltage from the boosting section and outputting the control signal. Then, the boosting ability is reduced as the boosted voltage approaches a target voltage value. As a result, overshoot of the boosted voltage is prevented.

In this case, the booster circuits preferably further include a power supply voltage detection control section for detecting a power supply voltage and controlling the output of the boosted voltage detection control section. Then, the boosting ability is adjusted in accordance with the power supply voltage, so that the boosting ability is not reduced too much in operation at a low power supply voltage. Accordingly, overshoot of the boosted voltage is prevented even if a power supply voltage with a relatively wide bandwidth (range) is boosted. In addition, a delay in a setup time at a low-power-supply-voltage side is prevented.

The first through third booster circuits preferably further include a boosted voltage detection control section for detecting a power supply voltage and outputting the control signal. Then, the boosting ability is not enhanced too much even if the power supply voltage is high. Accordingly, even if a power supply voltage with a relatively wide bandwidth is boosted, overshoot of the boosted voltage is prevented.

BRIEF DESCRIPTION OF THE DRAWINGS

FIG. 4 is a circuit diagram showing a booster circuit according to a second embodiment of the present invention.

FIG. 19 is a timing chart showing boosting operation of the booster circuit of the seventh embodiment of the present invention.

DETAILED DESCRIPTION OF THE INVENTION

Embodiment 1

A first embodiment of the present invention will be described with reference to the drawings.

Figure 1:
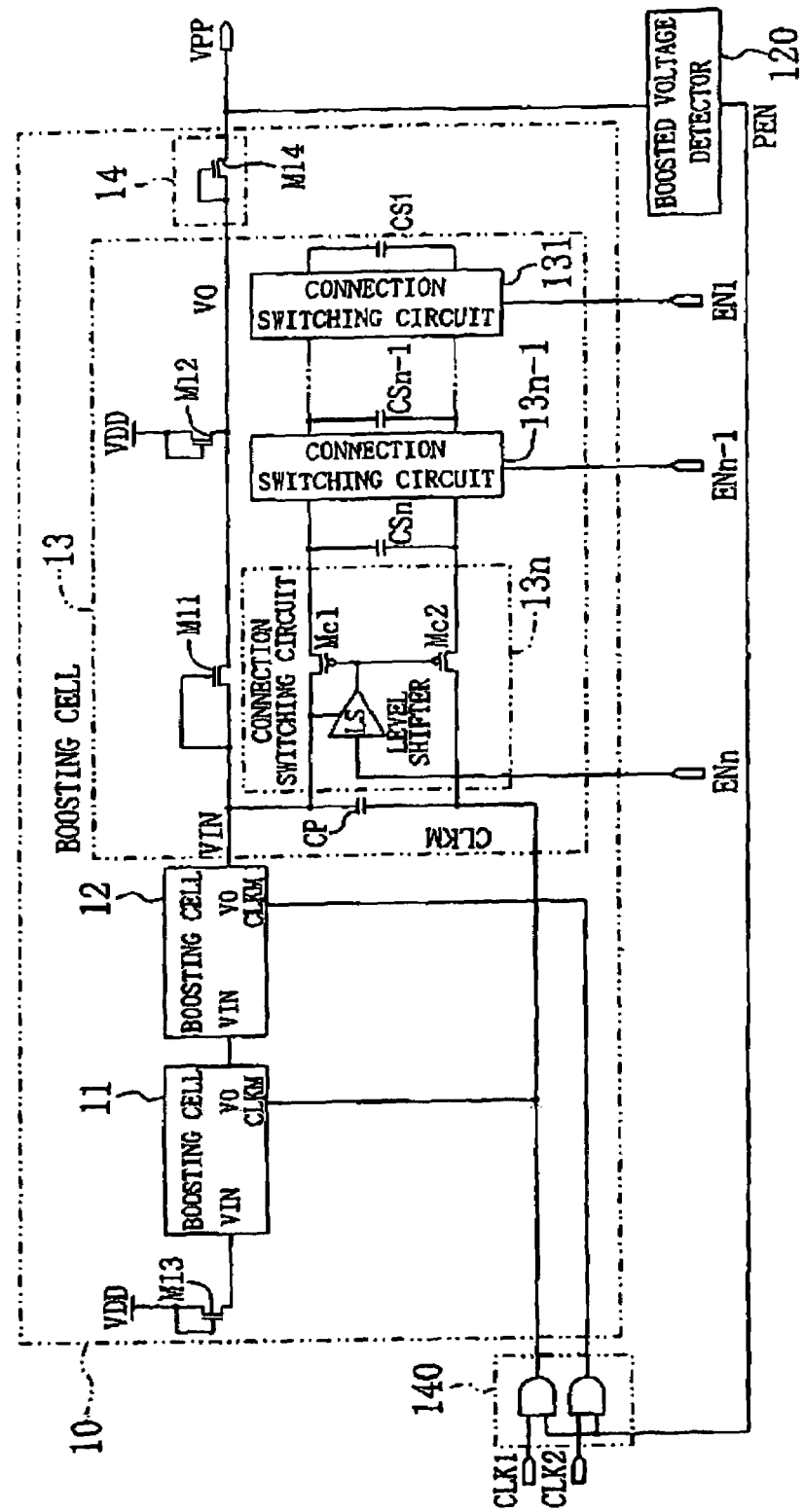
FIG. 1 is a circuit diagram showing a booster circuit according to a first embodiment of the present invention.

FIG. 1 shows a booster circuit according to the first embodiment of the present invention.

As shown in FIG. 1, the booster circuit of the first embodiment includes: a boosting section 10 including boosting cells 11, 12 and 13 in three stages connected in series and a power outputting unit 14 which is provided at the output side of the boosting cell 13 at the final stage and is constituted by an n-transistor M14 having a diode connection; a boosted voltage detector 120 for detecting an output voltage (boosted voltage) VPP output from the boosting section 10 and, when the detected output voltage VPP is lower than or equal to a given voltage value, outputting a clock control signal (detection signal) PEN; and a boosting clock control circuit 140 for selectively outputting a clock signal CLK1 or CLK2 received from the outside to each of the boosting cells 11 through 13, based on the clock control signal PEN.

Each of the boosting cells 11 through 13 includes: a first n-transistor M11 provided between an input terminal VIN and an output terminal VO and having its gate and drain connected to each other (a diode connection); a second n-transistor M12 whose gate and drain are connected to a power supply voltage VDD and whose source is connected to the source of the first n-transistor M11; and a boosting capacitor CP provided between a boosting clock input terminal CLKM for receiving the clock signal CLK1 or CLK2 and the drain of the first n-transistor M11.

The boosting capacitor CP is connected to n auxiliary boosting capacitors CS1 through CSn (where n is an integer of one or more) in parallel via connection switching circuits 131 through 13$n$ which are controlled by respective boosting ability switching signals EN1 through ENn as control signals input from the outside.

The input terminal VIN of the boosting cell 11 at the initial stage is connected to a third n-transistor M13 whose gate and drain are connected to a power supply voltage VDD.

To increase the boosting efficiency in the boosting section 10, the threshold voltages of the n-transistors M11 through M14 are preferably 0 V. The n-transistors M11 through M14 may be replaced with diodes. Pumping circuits of a four-phase clock type which cancel their threshold voltages may be also used.

Figure 2:
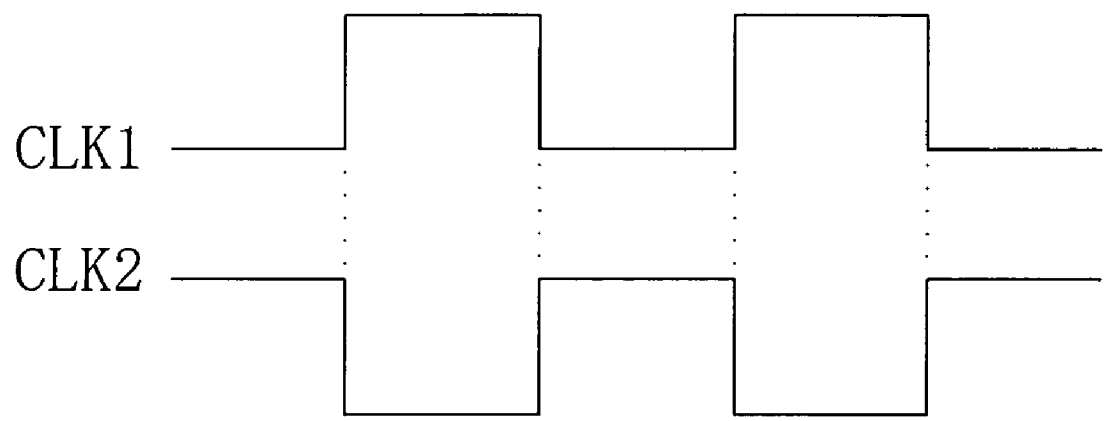
FIG. 2 is a diagram showing waveforms of clock signals supplied to the booster circuit of the first embodiment of the present invention.

As shown in FIG. 2, out of the complementary boosting clock signals CLK1 and CLK2, CLK1 is input to the boosting clock input terminals CLKM of the boosting cells 11 and 13 at the initial and final stages, thereby boosting an input voltage. On the other hand, CLK2 out of the boosting clock signals CLK1 and CLK2 is input to the boosting clock input terminal CLKM of the boosting cell 12 at the intermediate stage, thereby boosting an input voltage.

Each of the connection switching circuits 131 through 13$n$ includes: a level shifter LS for receiving a voltage input from the input terminal VIN and an associated one of the boosting ability switching signals EN1 through ENn; and first and second p-transistors Mc1 and Mc2 which are connected to the respective opposed electrodes of the boosting capacitor CP in series and have their gates connected to an output terminal of the level shifter LS.

Figure 3:
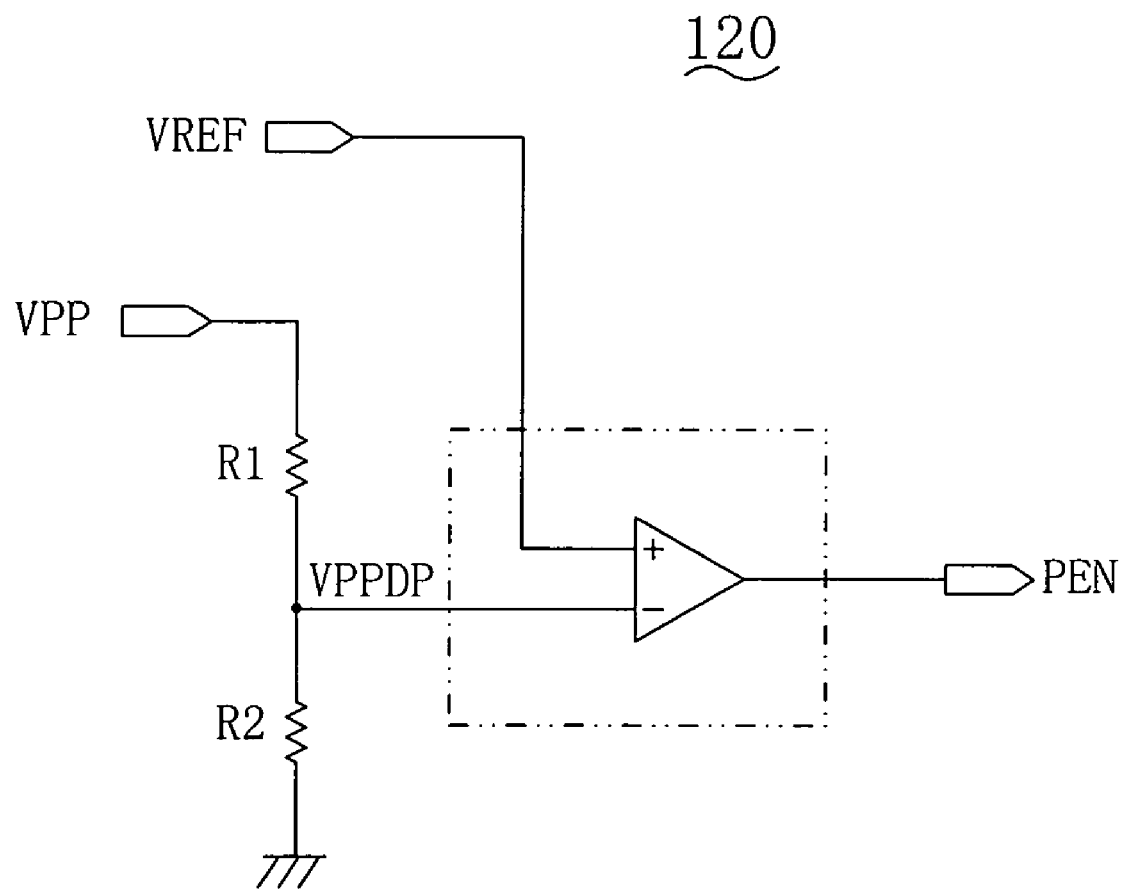
FIG. 3 is a circuit diagram showing an example of a boosted voltage detector constituting the booster circuit of the first embodiment of the present invention

As shown in FIG. 3, the boosted voltage detector 120 includes: resistors R1 and R2 connected in series between the boosted voltage VPP and a ground terminal; and a voltage comparator having an input terminal is connected to a connection node VPPDP between the resistors R1 and R2 and another input terminal to which a reference voltage VREF is input and comparing the voltage at the connection node VPPDP with the reference voltage VREF to output the clock control signal PEN. In this embodiment, a differential amplifier is used as the voltage comparator, the reference voltage VREF is applied to the non-inverted input terminal, and the voltage at the connection node VPPDP is applied to the inverted input terminal. With this configuration, the potential of the clock control signal PEN is at a high level when the voltage at the connection node VPPDP is lower than the reference voltage VREF, while being at a low level when the voltage at the connection node VPPDP is higher than the reference voltage VREF.

As shown in FIG. 1, the boosting clock control circuit 140 includes two AND circuits each of which receives the clock signal CLK1 or CLK2 at one input terminal and the clock control signal PEN at the other input terminal. The boosting clock control circuit 140 supplies the clock signal CLK1 or CLK2 to the boosting clock input terminals CLKM of the boosting cells 11 through 13 in accordance with the comparison results of the AND circuits. In this manner, the boosting clock control circuit 140 controls supply and suspension of the clock signal CLK1 or CLK2 to the booster unit 10 based on the clock control signal PEN from the boosted voltage detector 120, thereby controlling boosting operation in the boosting section 10.

Hereinafter, it will be described how the booster circuit thus configured operates.

In the boosting section 10 shown in FIG. 1, when the values of the boosting ability switching signals EN1 through ENn input from the outside are at low levels, the output values from the n level shifters LS included in the respective connection switching circuits 131 through 13n in each of the boosting cells 11 through 13 are at low levels. Accordingly, the p-transistors Mc1 and Mc2 in the connection switching circuits 131 through 13n are turned ON, so that the auxiliary boosting capacitors CS1 through CSn associated with the respective connection switching circuits 131 through 13n become electrically continuous, being connected to the boosting capacitor CP in parallel, resulting in enhanced boosting ability of the boosting section 10.

On the other hand, when the values of the respective boosting ability switching signals EN1 through ENn rise to high levels, the values of the outputs from the level shifters LS are at the voltage levels at the respective output terminals VO, so that the p-transistors Mc1 and Mc2 in the connection switching circuits 131 through 13n are turned OFF. Accordingly, the auxiliary boosting capacitors CS1 through CSn associated with the respective connection switching circuits 131 through 13n are electrically disconnected from the boosting capacitor CP, thus reducing the boosting ability of the boosting section 10. In addition, the disconnection of the auxiliary boosting capacitors CS1 through CSn also reduces parasitic capacitance, so that current consumption in the boosting section 10 is reduced.

For example, with the booster circuit of the first embodiment, the values of part of or all the boosting ability switching signals EN1 through ENn are adjusted to low levels and the number of auxiliary boosting capacitors CSn connected to the boosting capacitor CP is increased in an operation mode in which the amount of load current is large, out of modes with different amounts of load current, e.g., an operation mode or a standby mode in a semiconductor device in which the booster circuit is incorporated. This enhances the boosting ability of the boosting section 10.

On the other hand, in a standby mode in which the amount of load current is small, the values of part of or all the boosting ability switching signals EN1 through ENn are adjusted to high levels and the number of auxiliary boosting capacitors CSn connected to the boosting capacitor CP is reduced so that the boosting ability of the boosting section 10 is reduced.

As described above, in the first embodiment, the number of auxiliary boosting capacitors CSn in each of the boosting cells 11 through 13 is increased and decreased to have different capacitances in the boosting cells 11 through 13, depending on the control signals (the boosting ability switching signals EN1 through ENn) from the outside, so that the boosting ability of the boosting section 10 is adjusted. Accordingly, overshoot with respect to a target voltage (the reference voltage VREF) set in the boosting voltage detector 120 is prevented, thus enhancing the reliability of components constituting the booster circuit. In addition, the boosting ability is reduced in an operation mode in which a low level of boosting ability is sufficient, so that current consumption in the booster circuit is reduced.

The boosting cells 11 through 13 in the boosting section 10 are configured in three stages in this embodiment. However, the configuration is not limited to this specific embodiment and may be in one stage or four or more stages.

Embodiment 2

Hereinafter, a second embodiment of the present invention will be described with reference to the drawings.

FIG. 4 shows a booster circuit according to the second embodiment of the present invention. In FIG. 4, each member already shown in FIG. 1 will be identified by the same reference numeral, and the description thereof will be omitted.

As shown in FIG. 4, the booster circuit of the second embodiment includes: a boosting section 10A including boosting cells 21, 22 and 23 in three stages connected in series and a power outputting unit 24 provided at the output side of the boosting cell 23 at the final stage and constituted by an n-transistor having a diode connection; a boosted voltage detector 120 for detecting an output voltage (boosted voltage) VPP output from the boosting section 10A and, when the detected output voltage VPP is lower than or equal to a given voltage value, outputting a clock control signal PEN; a boosting clock control circuit 140 for selectively outputting a clock signal CLK1 or CLK2 received from the outside to each of the boosting cells 11 through 13 based on the clock control signal PEN; and clock amplitude switching circuits 51 and 52 each for outputting a clock signal switched by changing the amplitude of the clock signal CLK1 or CLK2.

Each of the boosting cells 21 through 23 includes: a first n-transistor M21 provided between an input terminal VIN and an output terminal VO and having a diode connection; a second n-transistor M22 whose gate and drain are connected to a power supply voltage VDD and whose source is connected to the source of the first n-transistor M21; and a boosting capacitor CP provided between a boosting clock input terminal CLKM and the drain of the first n-transistor M21.

The input terminal VIN of the boosting cell 21 at the initial stage is connected to a third n-transistor M23 whose gate and drain are connected to a power supply voltage VDD.

To increase the boosting efficiency in the boosting section 10A, the threshold voltages of the n-transistors M21 through M23 are preferably 0 V. The first and second n-transistors M21 and M22 may be replaced with diodes. Pumping circuits of a four-phase clock type which cancel their threshold voltages may be also used.

Each of the clock amplitude switching circuits 51 and 52 provided between the boosting section 10A and the boosting clock control circuit 140 includes: a p-transistor M24 having its source connected to a power supply voltage VDD; and a fourth n-transistor M25 having its source connected to a ground voltage VSS. Between the drains of the p-transistor M24 and the fourth n-transistor M25, n n-transistors MNv1 through MNvn (where n is an integer of one or more) each of which has its gate and drain are connected to each other and is used for switching the amplitude of the input clock signal CLK1 or CLK2 are connected in series. The gates of the p-transistor M24 and the fourth n-transistor M25 are connected to each other, and the clock signal CLK1 or the clock signal CLK2, which is complementary to the clock signal CLK1, is input to this common gate. In addition, n p-transistors MPv1 through MPvn as switching elements are connected to the drains and sources of the respective associated n-transistors MNv1 through MNvn. The boosting ability control signals EN1 through ENn are input to the respective gates of the p-transistors MPv1 through MPvn.

With this configuration, the clock signal CLK1 or CLK2 input from the outside has its amplitude changed by the clock amplitude switching circuit 51 or 52 and then is supplied to each of the boosting cells 21 through 23.

Hereinafter, it will be described how the booster circuit thus configured operates.

Figure 5A:
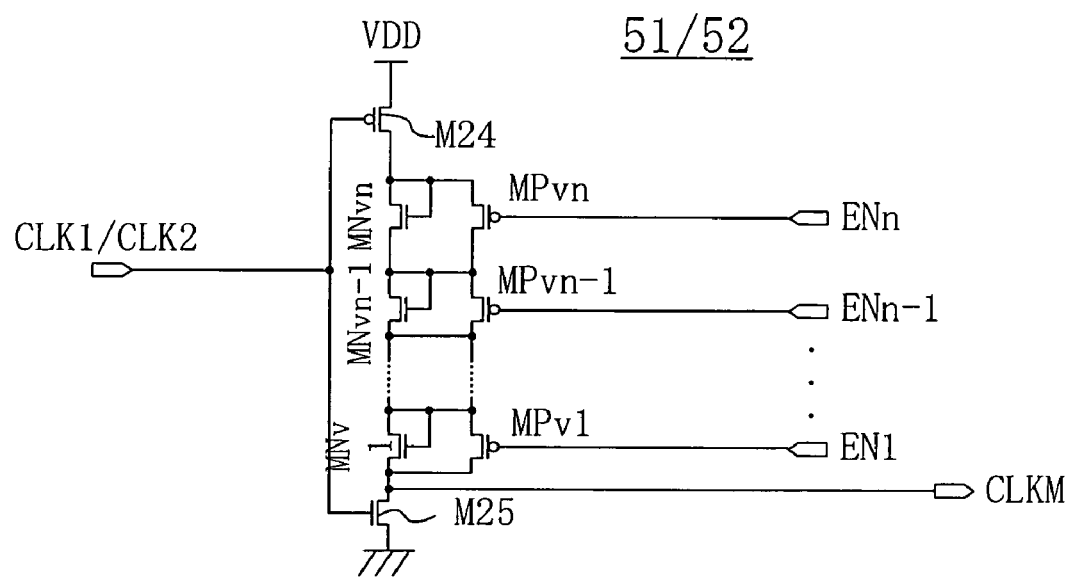
FIG. 5A is a circuit diagram showing an example of a clock amplitude switching circuit constituting the booster circuit of the second embodiment of the present invention
Figure 5B:
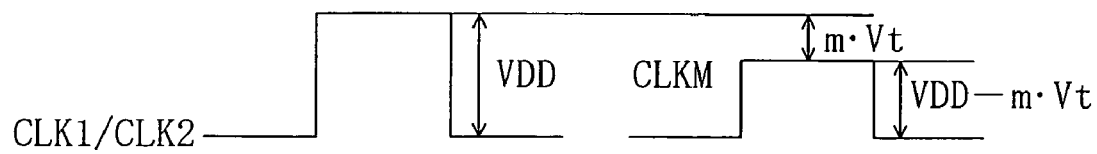
FIG. 5B is a diagram showing waveforms of input and output signals in the clock amplitude switching circuit shown in FIG. 5A.

As shown in FIG. 5A, the potentials of m boosting ability control signals EN1 through ENm (where m is an integer satisfying $1 \leq m \leq n$) out of the n boosting ability control signals EN1 through ENn are at high levels, the p-transistors MPv1 through MPvm as switching transistors in the clock amplitude switching circuit 51 or 52 are OFF, so that the amplitude of the output signal from the amplitude switching circuit 51 or 52 is VDD−m·Vt with respect to the amplitude VDD of the clock signal CLK1 or CLK2 as shown in FIG. 5B. Reference sign Vt represents the threshold voltage of each of the n-transistors MNv1 through NMvn. In this manner, in the boosting section 10A of the second embodiment, the amplitude of the clock signal for operating the boosting section 10A is reduced using the boosting ability control signals EN1 through ENn, so that the boosting ability of the boosting section 10A is reduced.

For example, if the booster circuit boosts the power supply voltage in a relatively wide bandwidth, the amplitude of a boosting clock signal is set smaller than that of the clock signal CLK1 or CLK2 input from the outside in the case of a high power supply voltage, so that the boosting ability of the boosting section 10A is reduced. This reduces the amplitude of the boosting clock signal, so that exceeding the breakdown voltage at a high power supply voltage is prevented.

As described above, in the booster circuit of the second embodiment, the amplitude of a boosting clock signal is set smaller than the amplitude of the clock signal CLK1 or CLK2 input from the outside, based on the control signals (boosting ability switching signals EN1 through ENn) from the outside, so that the boosting ability of the boosting section 10A is adjusted. Accordingly, overshoot with respect to a target voltage (the reference voltage VREF) set in the boosting voltage detector 120 is prevented, thus enhancing the reliability of components constituting the booster circuits. In addition, in operation with a relatively high power supply voltage, it is possible to prevent components from exceeding the breakdown voltage.

The boosting cells 21 through 23 in the boosting section 10A are configured in three stages in the second embodiment. However, the configuration is not limited to this specific embodiment and may be in one stage or four or more stages.

Embodiment 3

Hereinafter, a third embodiment of the present invention will be described with reference to the drawings.

Figure 6:
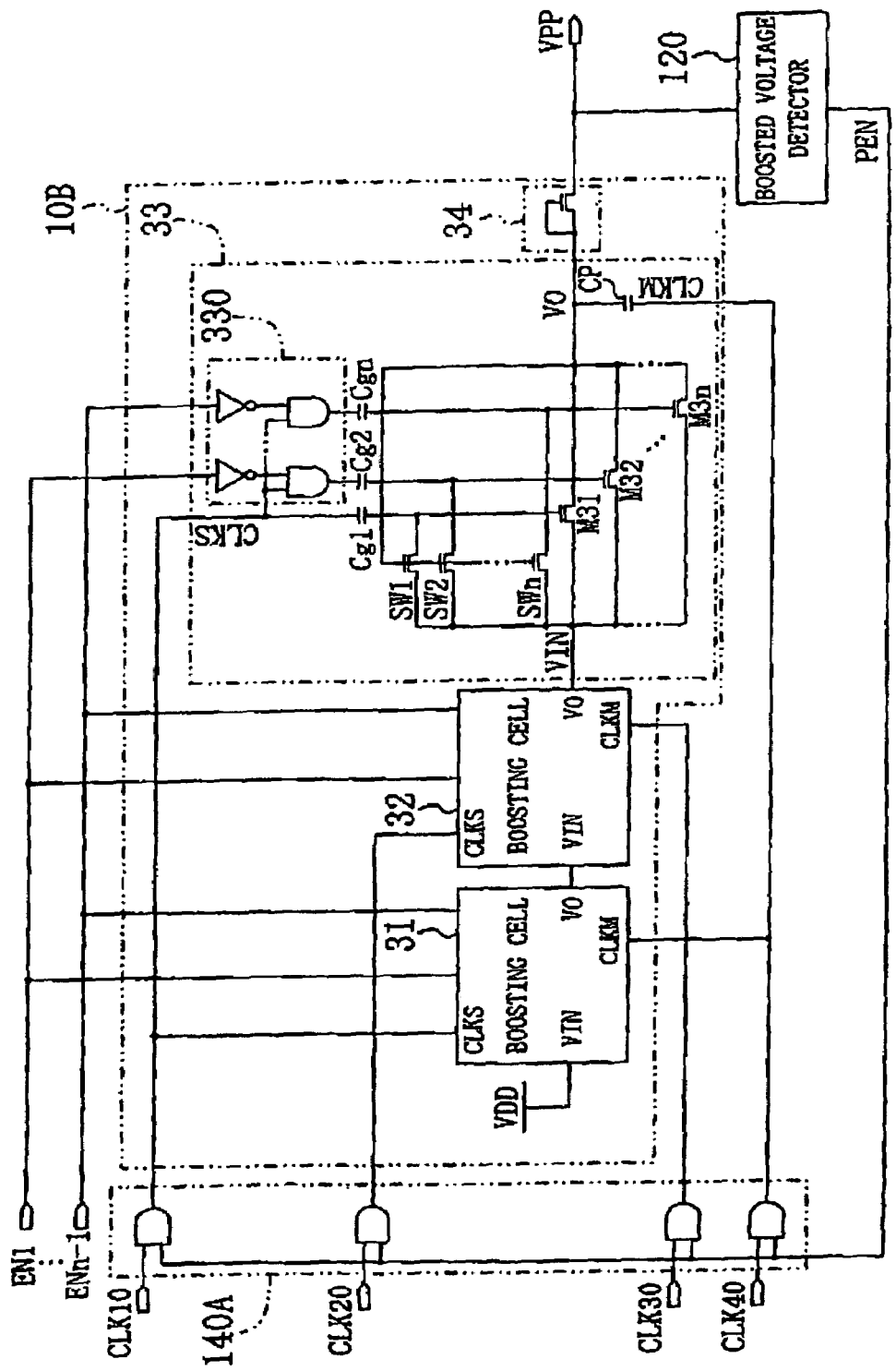
FIG. 6 is a circuit diagram showing a booster circuit according to a third embodiment of the present invention.

FIG. 6 shows a booster circuit according to the third embodiment of the present invention. In FIG. 6, each member already shown in FIG. 1 will be identified by the same reference numeral, and the description thereof will be omitted.

As shown in FIG. 6, the booster circuit of the third embodiment includes: a boosting section 10B including boosting cells 31, 32 and 33 in three stages connected in series and a power outputting unit 34 which is provided at the output side of the boosting cell 33 at the final stage and is constituted by an n-transistor having a diode connection; a boosted voltage detector 120 for detecting an output voltage (boosted voltage) VPP output from the boosting section 10B and, when the detected output voltage VPP is lower than or equal to a given voltage value, outputting a clock control signal PEN; and a boosting clock control circuit 104A each for selectively outputting a clock signal CLK10, CLK20, CLK30 or CLK40 received from the outside to each of the boosting cells 31 through 33 based on the clock control signal PEN.

Each of the boosting cells 31 through 33 includes: n charge transfer n-transistors M31 through M3$n$ (where n is an integer of two or more) provided between an input terminal VIN and an output terminal VO and connected in parallel; gate boosting capacitors Cg1 through Cgn connected to the gates of the respective charge transfer transistors M31 through M3$n$ and driving the gates; n switching transistors SW1 through SWn connected in series between the gates and drains of the respective charge transfer transistors M31 through M3$n$ and serving as n-transistors for establishing electrical connections or disconnections between the gates and the drains; and a boosting capacitor CP provided between the output terminal VO and a boosting clock input terminal CLKM to which the clock signal CLK30 or CLK40 is input.

Each of the boosting cells 31 through 33 further includes: a charge-transfer-transistor control circuit 330 for receiving boosting ability switching signals EN1 through ENn−1 as control signals from the outside and selectively applying drive voltages to the capacitors Cg2 though Cgn out of the gate boosting capacitors Cg1 through Cgn. The clock signal CLK10 or CLK20 is directly input to the gate boosting capacitor Cg1 via the control clock input terminal CLKS.

The charge-transfer-transistor control circuit 330 includes: n−1 inverters each of which receives one of the boosting ability switching signals EN1 through ENn−1; and n−1 AND circuits each of which receives the output from an associated one of the inverters at one input terminal and receives the clock signal CLK10 or CLK20 at the other input terminal.

With this configuration, the clock signal CLK10 or CLK20 is selectively applied to the gate boosting capacitors Cg2 through Cgn based on the boosting ability control signals EN1 through ENn−1, thus adjusting the number of transistors to be driven out of the charge transfer transistors M32 through M3$n$.

Figure 7:
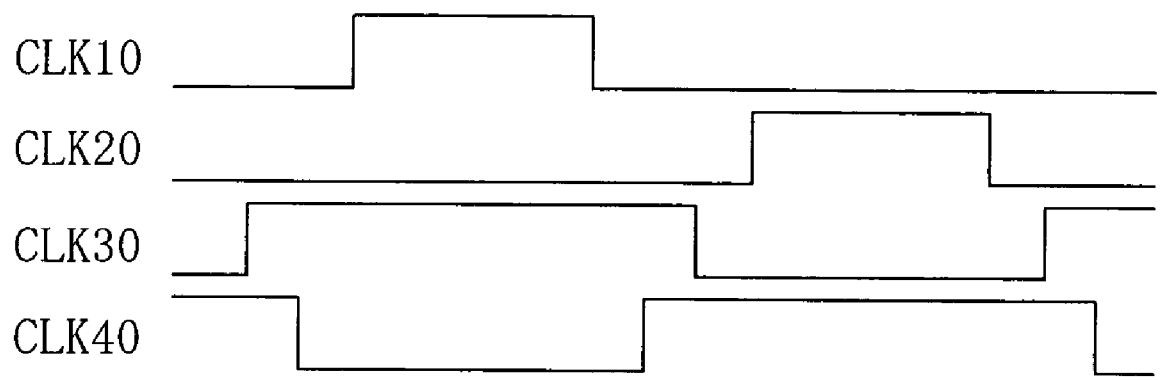
FIG. 7 is a diagram showing waveforms of clock signals supplied to the booster circuit of the third embodiment of the present invention.

FIG. 7 is a timing chart of the clock signals CLK10, CLK20, CLK30 and CLK40 used in the third embodiment. In the boosting cell 33 at the final stage, for example, with respect to a period during which the potential of the clock signal CLK10 applied to the control clock input terminal CLKS is at a high level, the clock signal CLK40 applied to the boosting clock input terminal CLKM transitions to a low level before the potential of the clock signal CLK10 transitions to the high level, and the clock signal CLK40 transitions to a high level after the potential of the clock signal CLK10 has transitioned to a low level.

As in the first embodiment, the boosting clock control circuit 140A controls the outputs of the clock signals CLK10, CLK20, CLK30 and CLK40 at the same time using the clock signal PEN from the boosted voltage detector 120.

To increase the boosting efficiency in the boosting section 10B, the threshold voltages of the n-transistors M31 through M3$n$ are also preferably 0 V in this embodiment.

Hereinafter, it will be described how the booster circuit thus configured operates.

In the boosting section 10B, charge is sequentially accumulated in the boosting capacitors CP in such a manner that charge is accumulated in the boosting capacitor CP included in the boosting cell 31 at the initial stage, in the boosting capacitor CP included in the boosting cell 32 at the intermediate stage, and then in the boosting capacitor CP included in the boosting cell 33 at the final stage in order, thereby obtaining a given boosted voltage. In this case, in transferring the voltage boosted with the boosting capacitor CP at the initial stage to the boosting capacitor CP at the intermediate stage, the potential of the clock signal CLK20 input to the gate boosting capacitors Cg1 through Cgn at the intermediate stage is changed from a low level to a high level, thereby suppressing a voltage drop of the boosted voltage which is being transferred from the initial stage.

Subsequently, the boosted voltage transferred to the boosting capacitor CP at the intermediate state from the initial stage is further raised by changing the potential of the input clock signal CLK30 from a low level to a high level. The boosted voltage transferred from the boosting cell 32 at the intermediate stage is transferred to the boosting cell 33 at the final stage and is raised by a given voltage. This series of boosting operation is repeated, thereby generating a boosted voltage higher than a power supply voltage VDD. The boosted voltage is supplied to an input terminal of the n-transistor constituting the power outputting unit 34.

In the third embodiment, when the potential of the m-th control signal ENm (where m is an integer satisfying $2 \leq m \leq n$) out of the boosting ability control signals EN1 through ENn−1 is at a high level, the charge-transfer-transistor control circuit 330 does not supply the clock signal CLK10 or CLK20 to the gate boosting capacitor Cgm connected to the gate of the charge transfer transistor M3m. Accordingly, the charge transfer transistor M3m is OFF, so that no charge is transferred to the output terminal VO.

Figure 8:
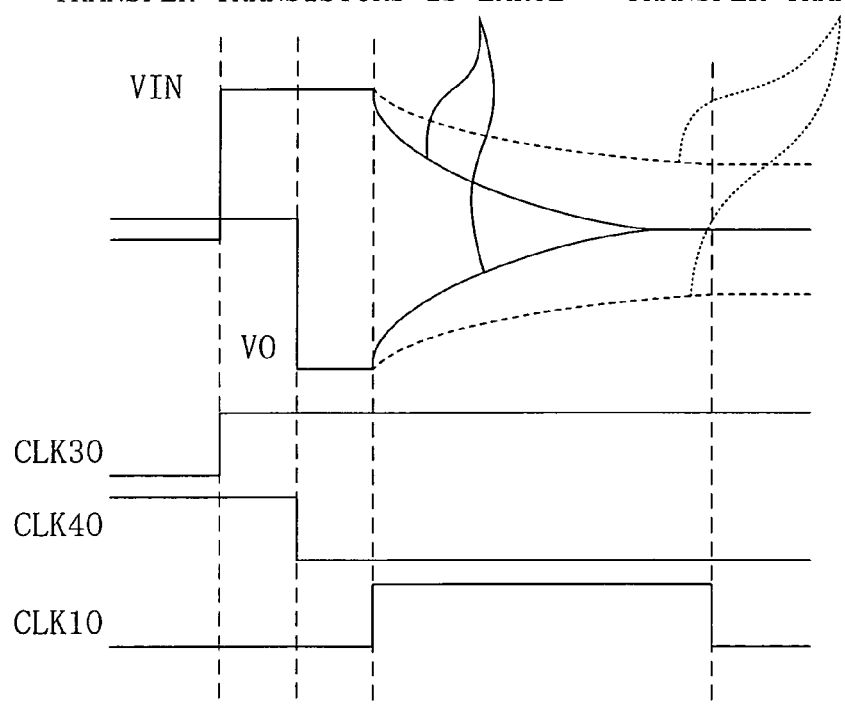
FIG. 8 is a timing chart showing boosting operation of the booster circuit of the third embodiment of the present invention.

FIG. 8 shows internal waveforms of a boosted voltage in respective cases where the number of operating transistors out of the n charge transfer transistors M31 through M3n is large and where the number of operating transistors is small.

As shown in FIG. 8, in a case where the number of operating transistors out of the charge transfer transistors M31 through M3n in each of the boosting cells 31 through 33 is large, charge is transferred at high speed, so that the boosting ability is high. On the other hand, in a case where the number of operating transistors out of the charge transfer transistors M31 through M3n is small, charge is transferred at low speed, so that the boosting ability is low. By thus reducing the transfer speed, the peak value of power supply current in boosting operation is reduced.

For example, the values of part of or all the boosting ability switching signals EN1 through ENn are adjusted to low levels and the number of operating transistors out of the charge transfer transistors M32 through M3n connected to the gate boosting capacitors Cg2 through Cgn is increased in an operation mode in which the amount of load current is large, out of modes with different amounts of load current, e.g., an operation mode or a standby mode in a semiconductor device in which the booster circuit is incorporated. This enhances the boosting abilities of the boosting cells 31 through 33.

On the other hand, in a standby mode in which the amount of load current is small, the values of part of or all the boosting ability switching signals EN1 through ENn are adjusted to high levels and the number of operating transistors out of the charge transfer transistors M32 through M3n connected to the gate boosting capacitors Cg2 through Cgn is reduced, so that the boosting abilities of the boosting cells 31 through 33 are reduced.

As described above, in the booster circuit of the third embodiment, the number of transistors to be driven out of the charge transfer transistors M32 through M3n in each of the boosting cells 31 through 33 is adjusted based on the control signals (the boosting ability switching signals EN1 through ENn−1) input from the outside, so that the boosting ability of the boosting section 10B is adjusted. Accordingly, overshoot with respect to a target voltage (the reference voltage VREF) set in the boosting voltage detector 120 is prevented, thus enhancing the reliability of components constituting the booster circuit. In addition, the peak value of power supply current in boosting operation is reduced, thus suppressing operation noise in the booster circuit.

The boosting cells 31 through 33 in the boosting section 10B are configured in three stages in this embodiment. However, the configuration is not limited to this specific embodiment and may be in one stage or four or more stages.

Embodiment 4

Hereinafter, a fourth embodiment of the present invention will be described with reference to the drawings.

Figure 9:
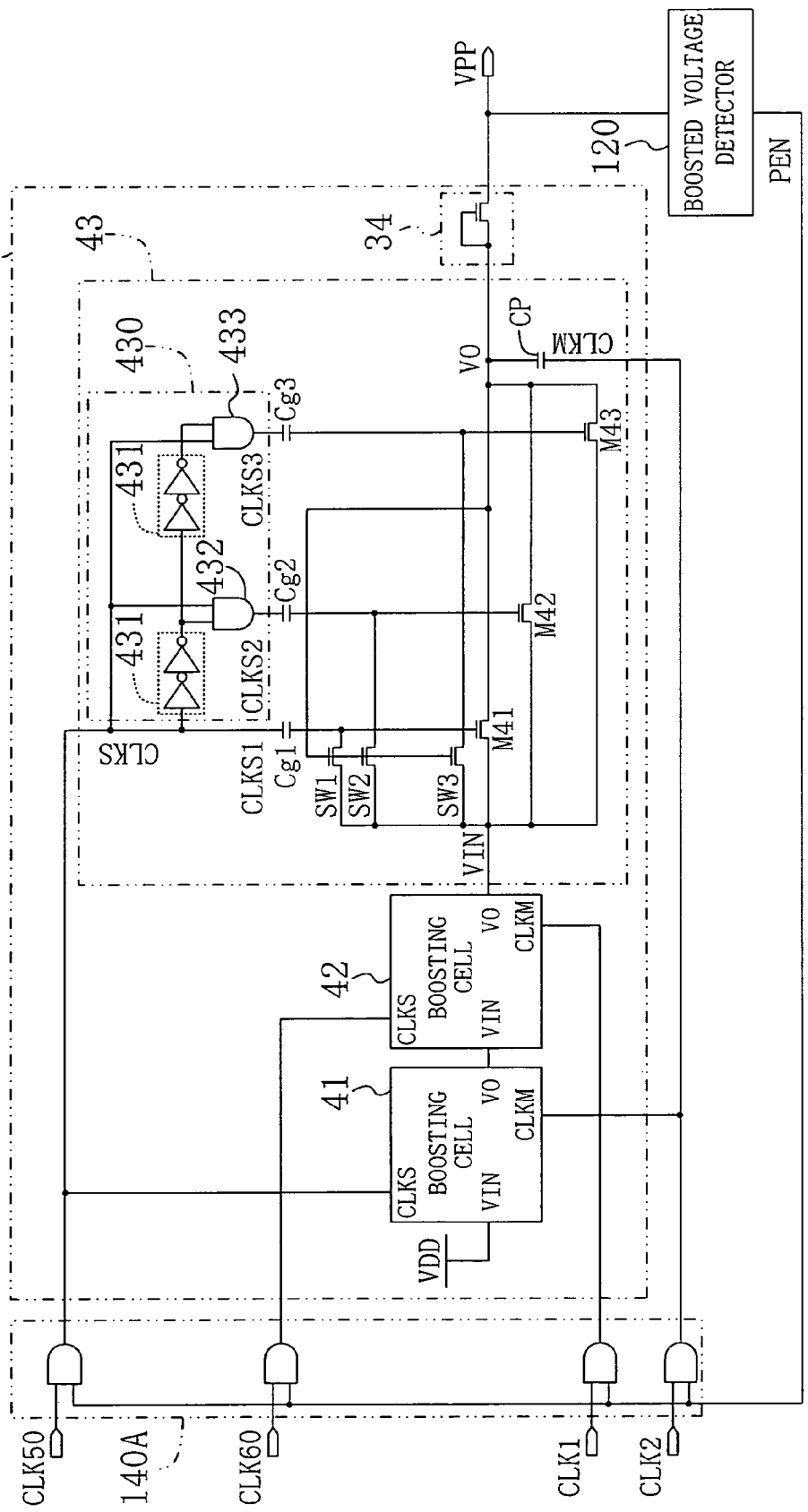
FIG. 9 is a circuit diagram showing a booster circuit according to a fourth embodiment of the present invention.

FIG. 9 shows a booster circuit according to the fourth embodiment of the present invention. In FIG. 9, each member already shown in FIGS. 1 and 6 will be identified by the same reference numeral, and the description thereof will be omitted.

As shown in FIG. 9, the booster circuit of the fourth embodiment includes: a boosting section 10C including boosting cells 41, 42 and 43 in three stages connected in series and a power outputting unit 34 provided at the output side of the boosting cell 43 at the final stage; a boosted voltage detector 120 for detecting an output voltage (boosted voltage) VPP output from the boosting section 10C and, when the detected output voltage VPP is lower than or equal to a given voltage value, outputting a clock control signal PEN; and a boosting clock control circuit 140A each for selectively outputting a clock signal CLK50, CLK60, CLK1 or CLK2 received from the outside to each of the boosting cells 41 through 43 based on the clock control signal PEN.

Each of the boosting cells 41 though 43 includes: three charge transfer n-transistors M41 through M43 provided between an input terminal VIN and an output terminal VO and connected in parallel; gate boosting capacitors Cg1 through Cg3 connected to the gates of the respective charge transfer transistors M41 through M43 and driving the gates; three switching transistors SW1 through SW3 connected in series between the gates and drains of the respective charge transfer transistors M41 through M43 and serving as n-transistors for establishing electrical connections or disconnections between the gates and the drains; and a boosting capacitor CP provided between the output terminal VO and a boosting clock input terminal CLKM to which the clock signal CLK1 or CLK2 is input. In this embodiment, the three charge transfer transistors M41 through M43 are provided. However, the number of charge transfer transistors is not limited to this specific embodiment.

Each of the boosting cells 41 through 43 further includes: a charge-transfer-transistor shift control circuit 430 for receiving the clock signals CLK50 or CLK60 input from the outside and for providing delays to the timings of applying driving voltages to the gate boosting capacitors Cg2 and Cg3 out of the gate boosting capacitors Cg1 through Cg3. The clock signal CLK50 or CLK60 is directly input to the gate boosting capacitor Cg1 via the control clock input terminal CLKS.

The charge-transfer-transistor shift control circuit 430 includes: a first AND circuit 432 which has an input terminal connected to the control clock input terminal CLKS, another input terminal connected to the control clock input terminal CLKS via a delay circuit 431 constituted by two serially-connected inverters, and an output terminal connected to the gate boosting capacitor Cg2; and a second AND circuit 433 having an input terminal connected to the control clock input terminal CLKS, another input terminal connected to the control clock input terminal CLKS via two pairs of delay circuits 431 connected in series, and an output terminal connected to the gate boosting capacitor Cg3.

As in the third embodiment, the boosting clock control circuit 140A controls the outputs of the clock signals CLK50, CLK60, CLK1 and CLK2 at the same time with the clock signal PEN from the boosted voltage detector 120.

To increase the boosting efficiency in the boosting section 10C, the threshold voltages of the n-transistors M41 through M43 are also preferably 0 V in this embodiment.

As described above, the booster circuit of the fourth embodiment includes the charge-transfer-transistor shift circuit 430 for providing delays to the timing of applying driving voltages to the gate boosting capacitors Cg2 and Cg3 connected to the gates of the respective charge transfer transistors M42 and M43 in each of the boosting cells 41 through 43. Accordingly, the number of operating transistors out of the charge transfer transistors M41 through M43 increases in a stepwise manner.

Hereinafter, it will be described how the booster circuit thus configured operates.

First, the boosting clock signals CLK1 and CLK2 input to each of the boosting cells 41 through 43 are complementary square waves, as shown in FIG. 2.

Figure 10:
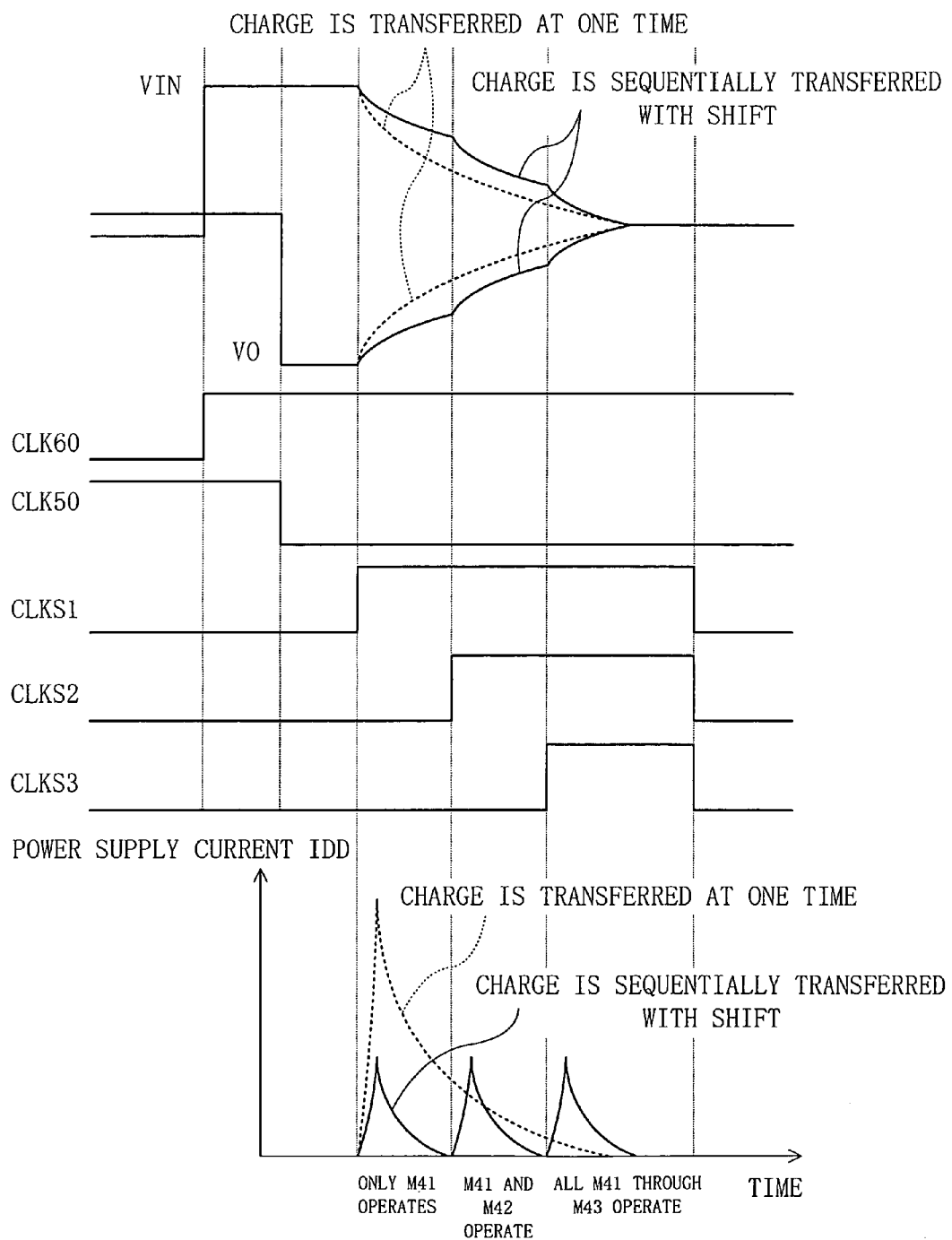
FIG. 10 is a timing chart showing boosting operation of the booster circuit of the fourth embodiment of the present invention.

In the boosting section 10C, charge is sequentially accumulated in the boosting capacitors CP in such a manner that charge is accumulated in the boosting capacitor CP included in the boosting cell 41 at the initial stage, in the boosting capacitor CP included in the boosting cell 42 at the intermediate stage, and then in the boosting capacitor CP included in the boosting cell 43 at the final stage, thereby obtaining a given boosted voltage. In this case, in transferring the voltage boosted with the boosting capacitor CP at the initial stage to the boosting capacitor CP at the intermediate stage, the potential of the clock signal CLK60 input to the gate boosting capacitors Cg1 through Cg3 at the intermediate stage is changed from a low level to a high level at a given timing. Accordingly, as shown in FIG. 10, the gate voltages CLKS1 through CLKS3 of the respective charge transfer transistors M41 through M43 increase in that order. Accordingly, the input charge is transferred step by step and, in addition, the peak value of power supply current in boosting operation is reduced.

As described above, in the booster circuit of the fourth embodiment, driving voltages are supplied with the timings of operating the charge transfer transistors M41 through M43 shifted from each other in each of the boosting cells 41 through 43, using a simple circuit configuration. Accordingly, the peak value of power supply current in boosting operation in the boosting section 10C is reduced and operation noise in the booster circuit is suppressed.

The boosting cells 41 through 43 in the boosting section 10C are configured in three stages in this embodiment. However, the configuration is not limited to this specific embodiment and may be in one stage or four or more stages.

Embodiment 5

Hereinafter, a fifth embodiment of the present invention will be described with reference to the drawings.

Figure 11:
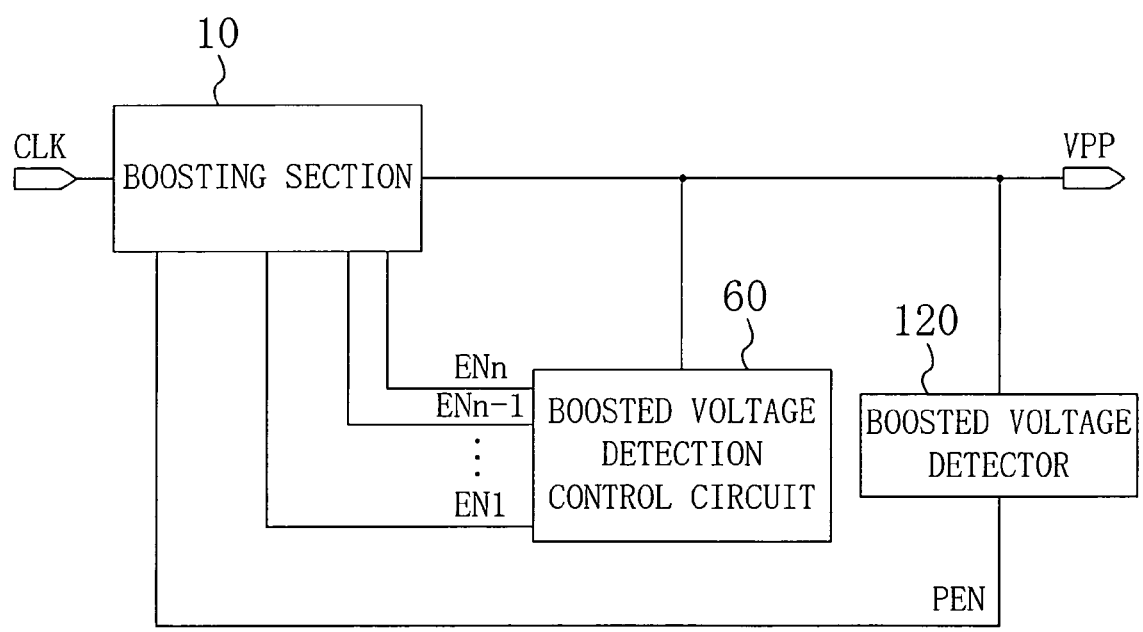
FIG. 11 is a block diagram showing a configuration of a booster circuit according to a fifth embodiment of the present invention.

FIG. 11 shows a block configuration of a booster circuit according to the fifth embodiment of the present invention. In FIG. 11, each member already shown in FIG. 1 will be identified by the same reference numeral, and the description thereof will be omitted.

As shown in FIG. 11, the booster circuit of the fifth embodiment includes: a boosting section 10; a boosted voltage detector 120 for detecting an output voltage (boosted voltage) VPP output from the boosting section 10 and, when the detected output voltage VPP is lower than or equal to a given voltage value, outputting a clock control signal PEN to the boosting section 10; and a boosted voltage detection control circuit 60 for detecting the output voltage VPP and outputting boosting ability switching signals EN1 through ENn as control signals to the boosting section 10 based on the detected output voltage VPP. In this embodiment, a boosted clock control circuit for receiving the clock control signal PEN is incorporated in the boosting section 10.

Figure 12:
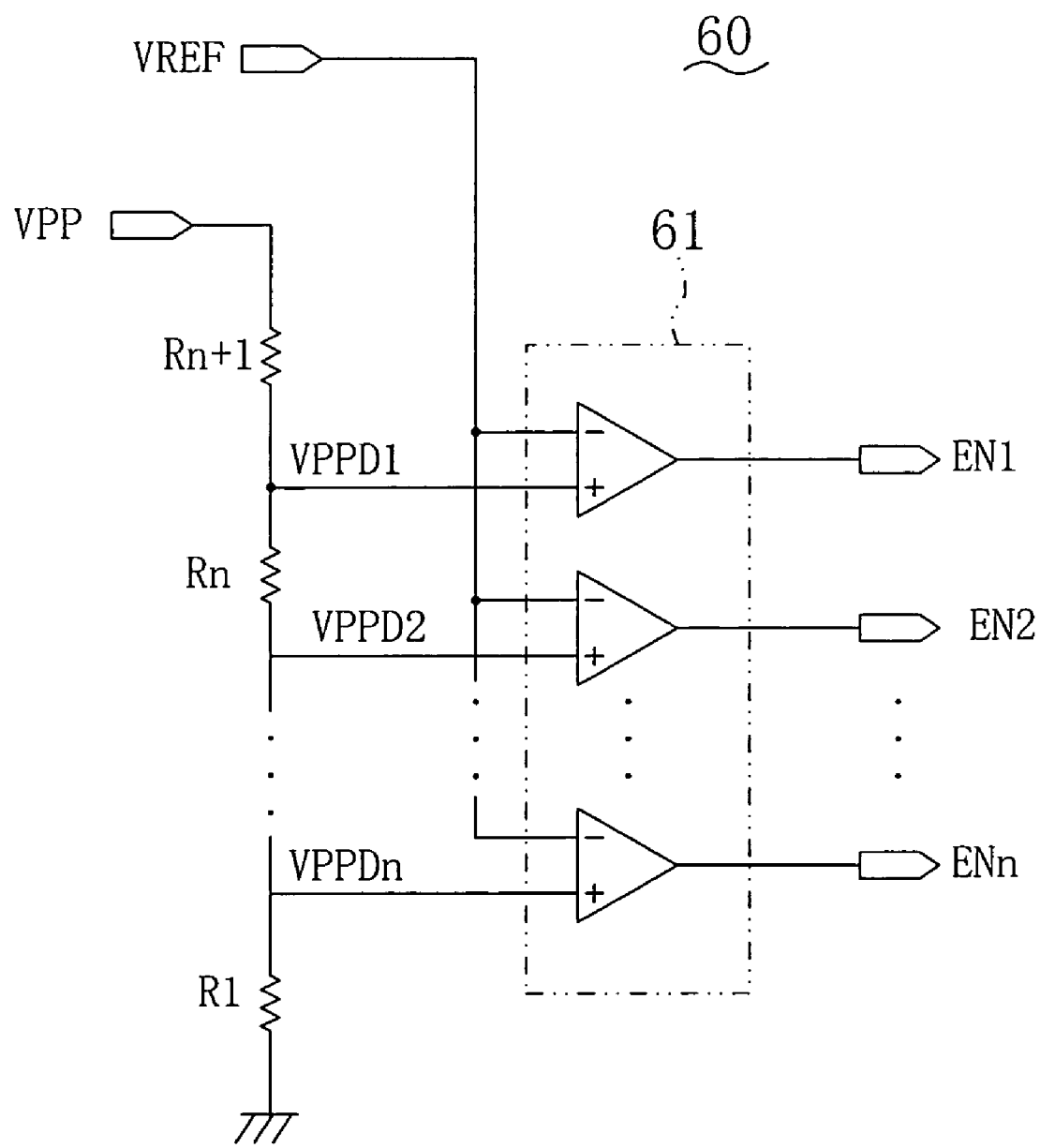
FIG. 12 is a circuit diagram showing an example of a boosted voltage detection control circuit constituting the booster circuit of the fifth embodiment of the present invention.

FIG. 12 shows an example of a circuit configuration of the boosted voltage detection control circuit 60.

As shown in FIG. 12, the boosted voltage detection control circuit 60 of the fifth embodiment includes: n+1 resisters R1 through Rn+1 (where n is an integer of one or more) connected in series between an output voltage VPP and a ground terminal; a voltage comparator 61 for receiving the potentials at nodes VPPD1 through VPPDn between respective adjacent two of the resisters R1 through Rn+1 and comparing the potentials at the nodes VPPD1 through VPPDn with a reference voltage VREF to output the boosting ability switching signals EN1 through ENn.

The voltage comparator 61 is composed of n differential amplifiers respectively outputting the boosting ability switching signals EN1 through ENn, receives the reference potential VREF at their inverted input terminals and receives the potentials at the nodes VPPD1 through VPPDn at their non-inverted input terminals.

With this configuration, the boosting ability switching signals EN1 through ENn output from the boosted voltage detection control circuit 60 and associated with the respective nodes are at low levels when the nodes VPPD1 through VPPDn dividing the boosted voltage VPP by the resistors are lower than the reference voltage VREF, while being at high levels when the nodes are higher than the reference voltage VREF.

Hereinafter, it will be described how the booster circuit having the aforementioned configuration operates with reference to FIG. 13 which shows a voltage waveform of the boosted voltage VPP output from the booster circuit.

Figure 13:
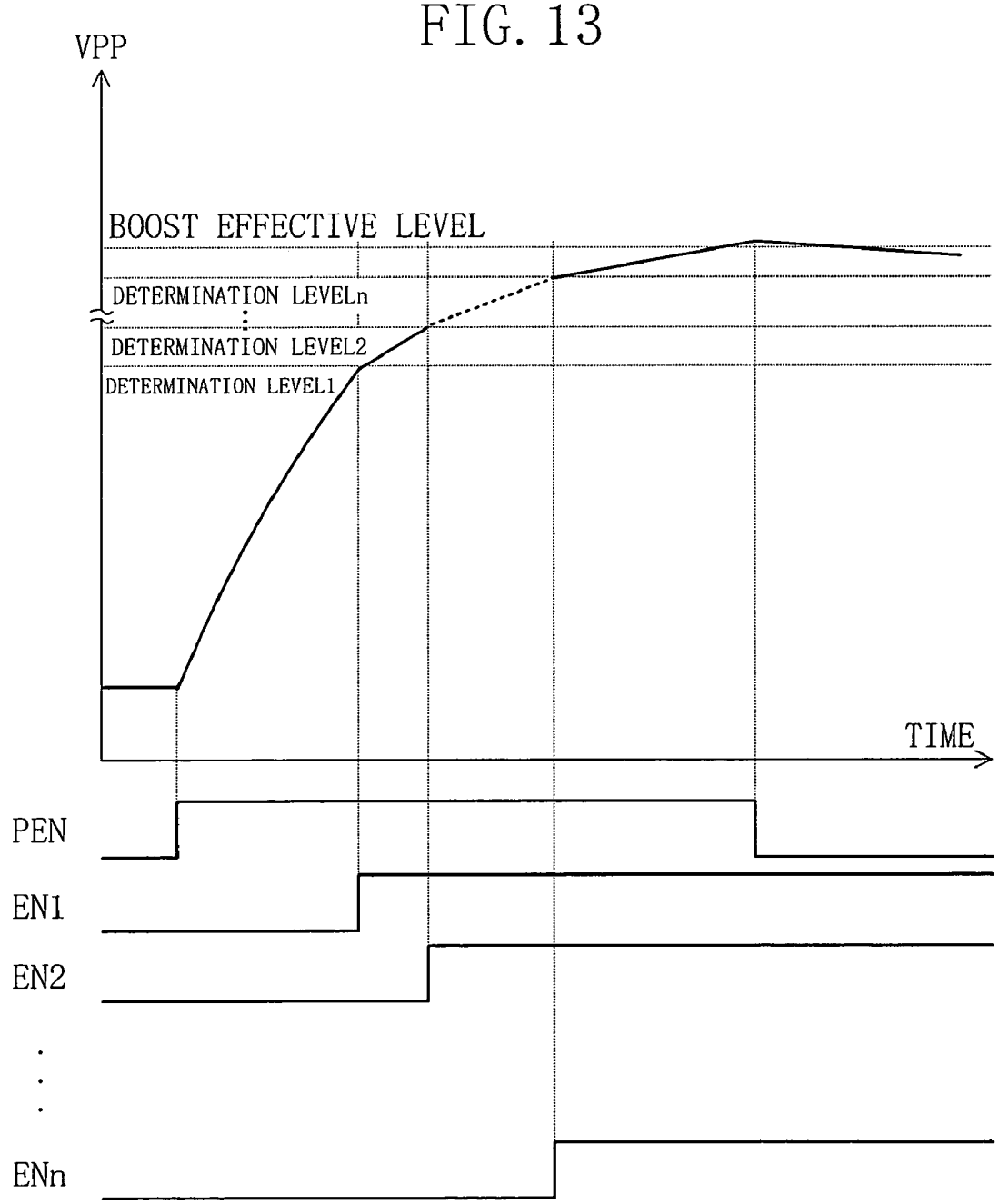
FIG. 13 is a timing chart showing boosting operation of the booster circuit of the fifth embodiment of the present invention.

As shown in FIG. 13, immediately after the clock control signal PEN rises to a high level and boosting operation is initiated, the boosted voltage VPP satisfies VPP<determination level 1<determination level 2< . . . <determination level n, so that the potentials of all the boosting ability switching signals EN1 through ENn output from the boosted voltage detection control circuit 60 are at low levels. Accordingly, as already described in the first embodiment, for example, the boosting ability of the boosting section 10 is at the maximum. The respective determination levels herein are calculated by the following equations:

determination level $n = VREF \times (R1+R2+ \ldots + Rn+1)/R1$ determination level $n-1 = VREF \times (R1+R2+ \ldots + Rn+1)/(R1+R2)$ determination level $1 = VREF \times (R1+R2+ \ldots + Rn+1)/(R1+R2+ \ldots +Rn)$ Thereafter, the boosted voltage VPP is gradually increased to exceed determination level 1, the potential of the boosting ability switching signal EN1 output from the boosted voltage detection control circuit 60 is raised to a high level, thereby reducing the boosting ability of the boosting section 10.

Then, the boosting operation continues with the boosting ability reduced step by step until the boosted voltage VPP exceeds a boost effective level which is higher than determination level n. When the boosted voltage VPP exceeds the boost effective level, the clock control signal PEN is deactivated, so that the boosting section 10 terminates its boosting operation.

As described above, the booster circuit of the fifth embodiment includes the boosted voltage detection control circuit 60 for detecting the voltage value of the output voltage VPP in the stepwise manner and outputting control signals (the boosting ability switching signals EN1 through ENn), and thus has its boosting ability reduced as the boosted voltage VPP approaches a target voltage which has been set. Accordingly, overshoot of the output voltage VPP is prevented, resulting in enhanced reliability of components constituting the booster circuit.

The boosting section 10 is not limited to the configuration described in the first embodiment. Alternatively, the boosting section 10A or 10B of the second or third embodiment may be used.

Embodiment 6

Hereinafter, a sixth embodiment of the present invention will be described with reference to the drawings.

Figure 14:
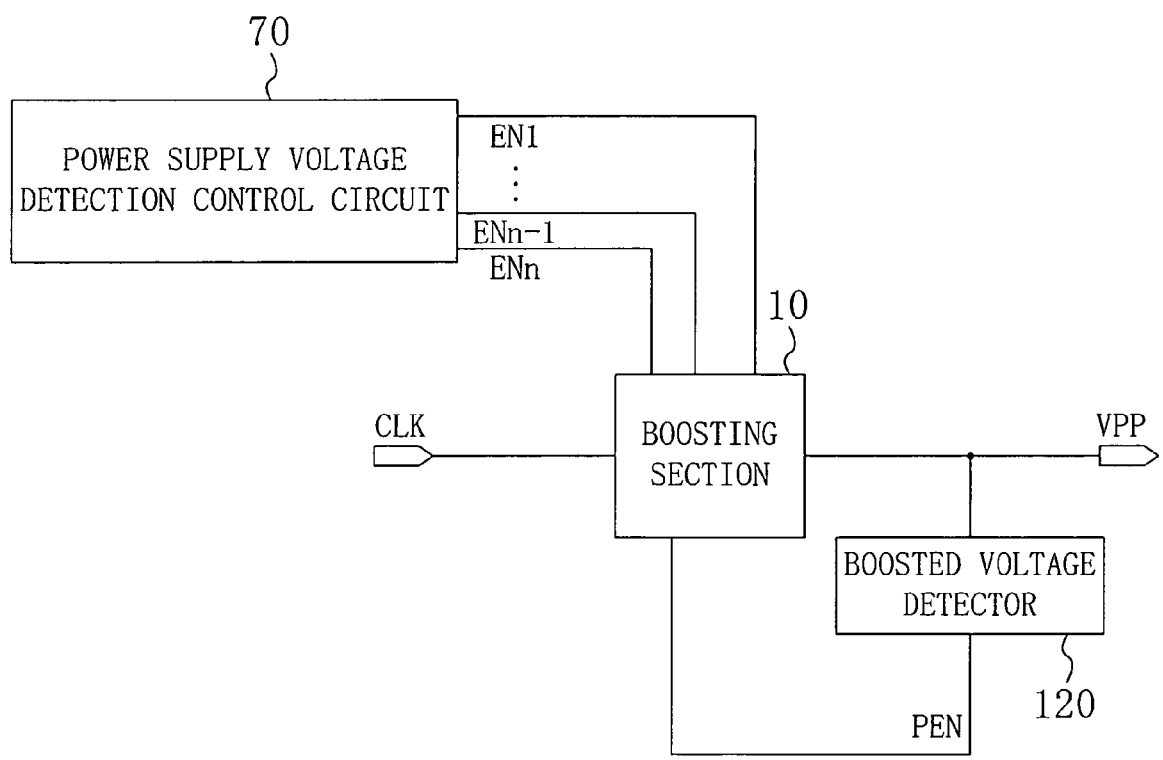
FIG. 14 is a block diagram showing a configuration of a booster circuit according to a sixth embodiment of the present invention.

FIG. 14 shows a block configuration of a booster circuit according to the sixth embodiment of the present invention. In FIG. 14, each member already shown in FIG. 1 will be identified by the same reference numeral, and the description thereof will be omitted.

As shown in FIG. 14, the booster circuit of the sixth embodiment includes: a boosting section 10; a boosted voltage detector 120 for detecting an output voltage (boosted voltage) VPP output from the boosting section 10 and, when the detected output voltage VPP is lower than or equal to a given voltage value, outputting a clock control signal PEN to the boosting section 10; and a power supply voltage detection control circuit 70 for outputting boosting ability switching signals EN1 through ENn as control signals to the boosting section 10 based on the power supply voltage VDD. In this embodiment, a boosted clock control circuit for receiving the clock control signal PEN is incorporated in the boosting section 10.

Figure 15:
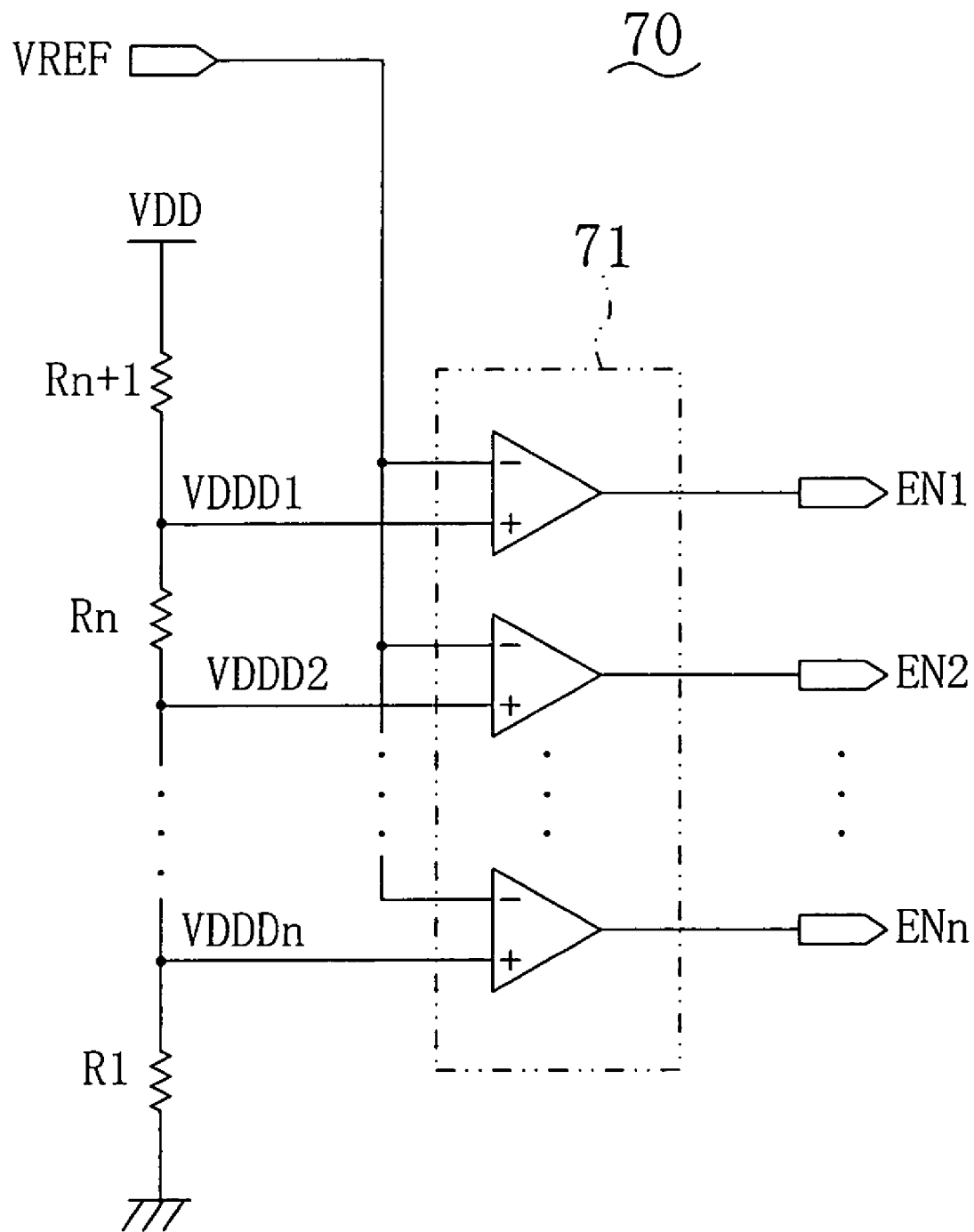
FIG. 15 is a circuit diagram showing an example of a power supply voltage detection control circuit constituting the booster circuit of the sixth embodiment of the present invention.

FIG. 15 shows an example of a circuit configuration of the power supply voltage detection control circuit 70.

As shown in FIG. 15, the power supply voltage detection control circuit 70 according to the sixth embodiment includes: n+1 resisters R1 through Rn+1 (where n is an integer of one or more) connected in series between the power supply voltage VDD and a ground terminal; a voltage comparator 71 for receiving the potentials at nodes VDDD1 through VDDDn between respective adjacent two of the resisters R1 through Rn+1 and comparing the potentials at the nodes VDDD1 through VDDDn with a reference voltage VREF to output the boosting ability switching signals EN1 through ENn.

The voltage comparator 71 is composed of n differential amplifiers respectively outputting the boosting ability switching signals EN1 through ENn, receives the reference potential VREF at their inverted input terminals and receives the potentials at the nodes VDDD1 through VDDDn at their non-inverted input terminals.

With this configuration, the boosting ability switching signals EN1 through ENn output from the power supply voltage detection control circuit 70 and associated with the respective nodes are at low levels when the nodes VDDD1 through VDDDn dividing the power supply voltage VDD by the resistors are lower than the reference voltage VREF, while being at high levels when the nodes are higher than the reference voltage VREF.

Hereinafter, it will be described how the booster circuit having the aforementioned configuration operates with reference to FIG. 16 which shows voltage waveforms of the boosted voltage VPP output from the booster circuit.

Figure 16:
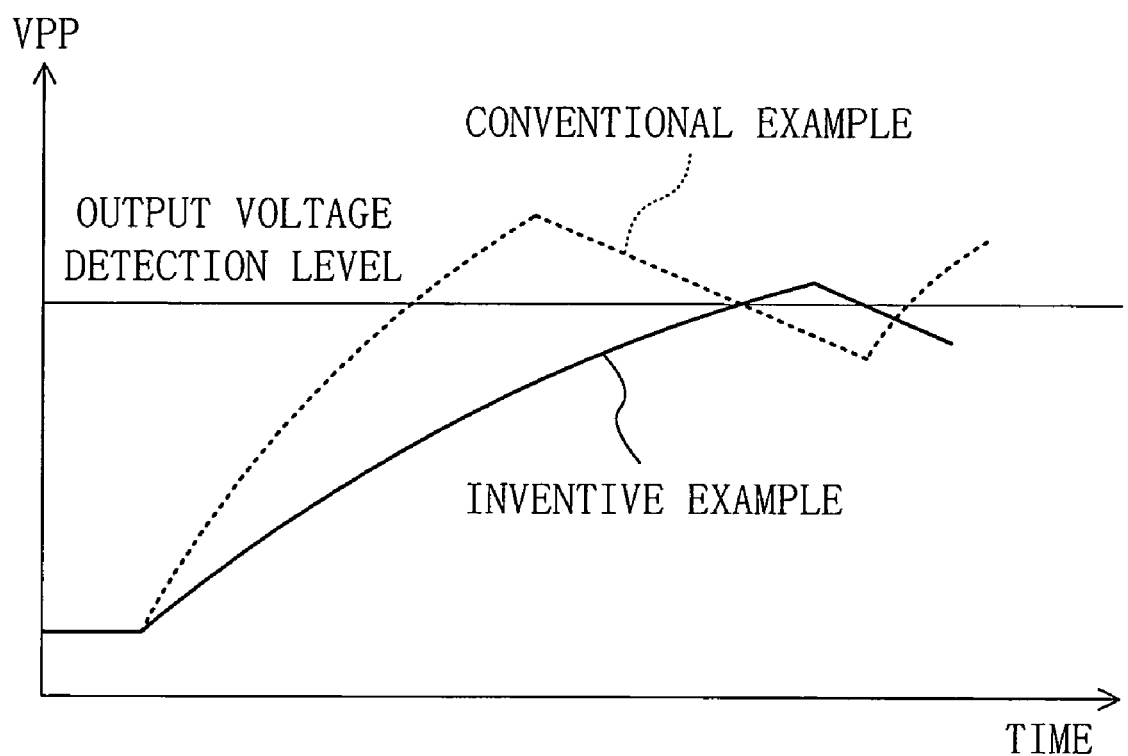
FIG. 16 is a timing chart showing boosting operation of the booster circuit of the sixth embodiment of the present invention.

As shown in FIG. 16, in the power supply voltage detection control circuit 70, when the power supply voltage VDD satisfies VDD<determination level 1, the potentials of all the boosting ability switching signals EN1 through ENn are at low levels, so that the boosting ability of the boosting section 10 is at the maximum.

On the other hand, when the power supply voltage VDD satisfies VDD>determination level 2, the potential of the boosting ability switching signal EN1 is at a high level, thereby reducing the boosting ability of the boosting section 10. In this case, the respective determination levels are calculated in the same manner as that described above.

As described above, the booster circuit of the sixth embodiment includes the power supply voltage detection control circuit 70 for detecting the voltage value of the power supply voltage VDD in the stepwise manner and outputting control signals (the boosting ability switching signals EN1 through ENn), so that it is possible to prevent the boosting ability of the boosting section 10 from rising too high even if the power supply voltage VDD is relatively high. Accordingly, even in the case of operating the booster circuit using a power supply voltage VDD with a wide bandwidth, overshoot of the output voltage VPP is prevented. As a result, the reliability of components constituting the booster circuit is enhanced.

The boosting section 10 is not limited to the configuration described in the first embodiment. Alternatively, the boosting section 10A or 10B of the second or third embodiment may be used.

Embodiment 7

Hereinafter, a seventh embodiment of the present invention will be described with reference to the drawings.

Figure 17:
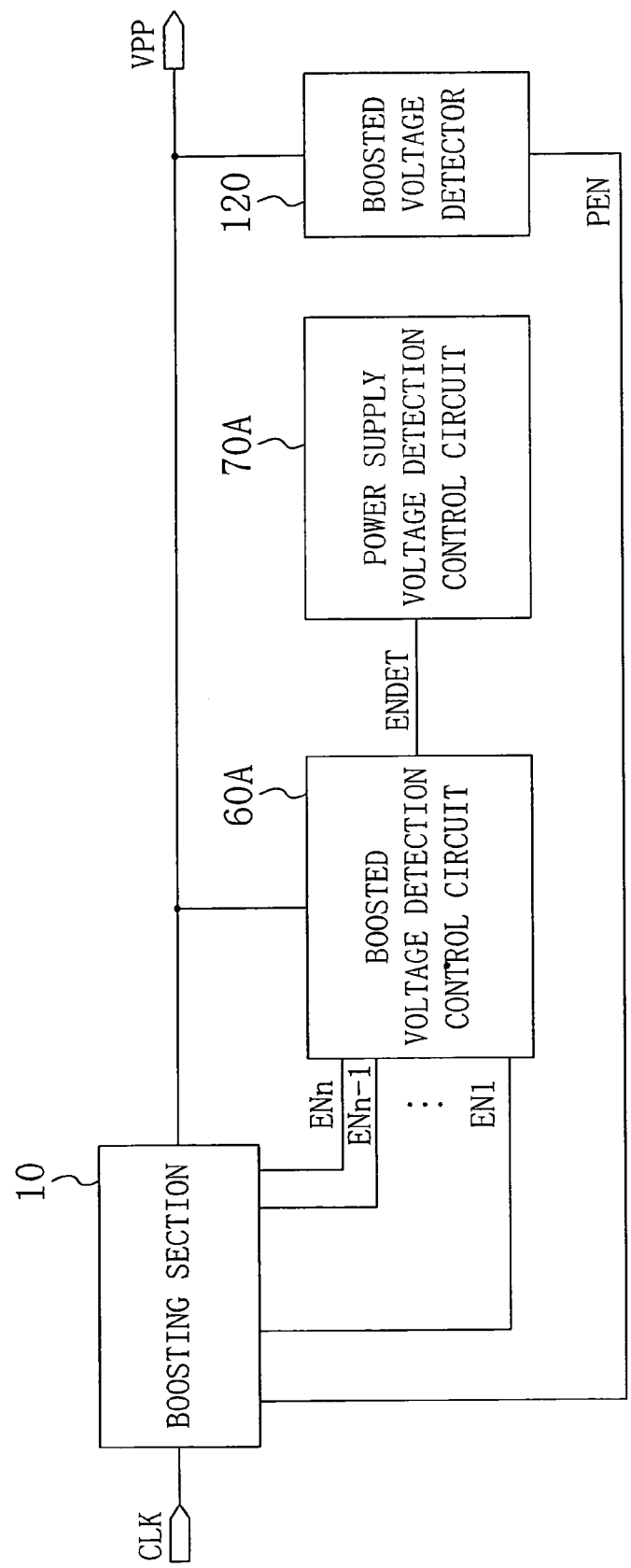
FIG. 17 is a block diagram showing a configuration of a booster circuit according to a seventh embodiment of the present invention.

FIG. 17 shows a block configuration of a booster circuit according to the seventh embodiment of the present invention. In FIG. 17, each member already shown in FIG. 1 will be identified by the same reference numeral, and the description thereof will be omitted.

As shown in FIG. 17, the booster circuit of the seventh embodiment includes: a boosting section 10; a boosted voltage detector 120 for detecting an output voltage (boosted voltage) VPP output from the boosting section 10 and, when the detected output voltage VPP is lower than or equal to a given voltage value, outputting a clock control signal PEN to the boosting section 10; a boosted voltage detection control circuit 60A for detecting the output voltage VPP and outputting boosting ability switching signals EN1 through ENn as control signals to the boosting section 10 based on the detected output voltage VPP; and a power supply voltage detection control circuit 70A for detecting a power supply voltage VDD and outputting a boosting ability switching enabling signal ENDET to the boosted voltage detection control circuit 60A. In this embodiment, a boosted clock control circuit for receiving the clock control signal PEN is incorporated in the boosting section 10.

Figure 18A:
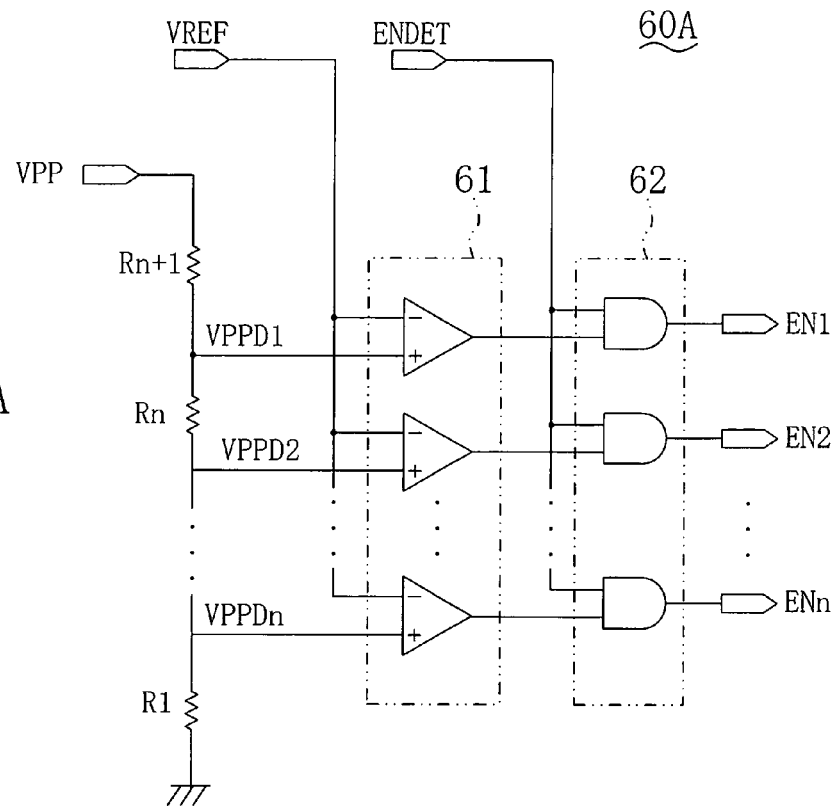
FIG. 18A is a circuit diagram showing an example of a boosted voltage detection control circuit constituting the booster circuit of the seventh embodiment of the present invention.
Figure 18B:
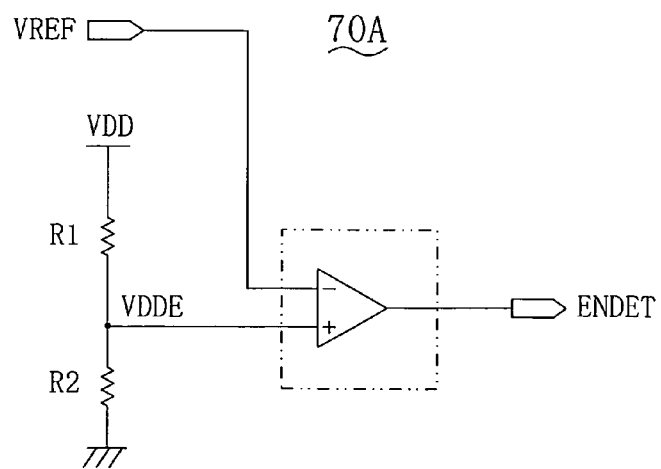
FIG. 18B is a circuit diagram showing an example of a power supply voltage detection control circuit constituting the booster circuit of the seventh embodiment of the present invention.
Figure 20:
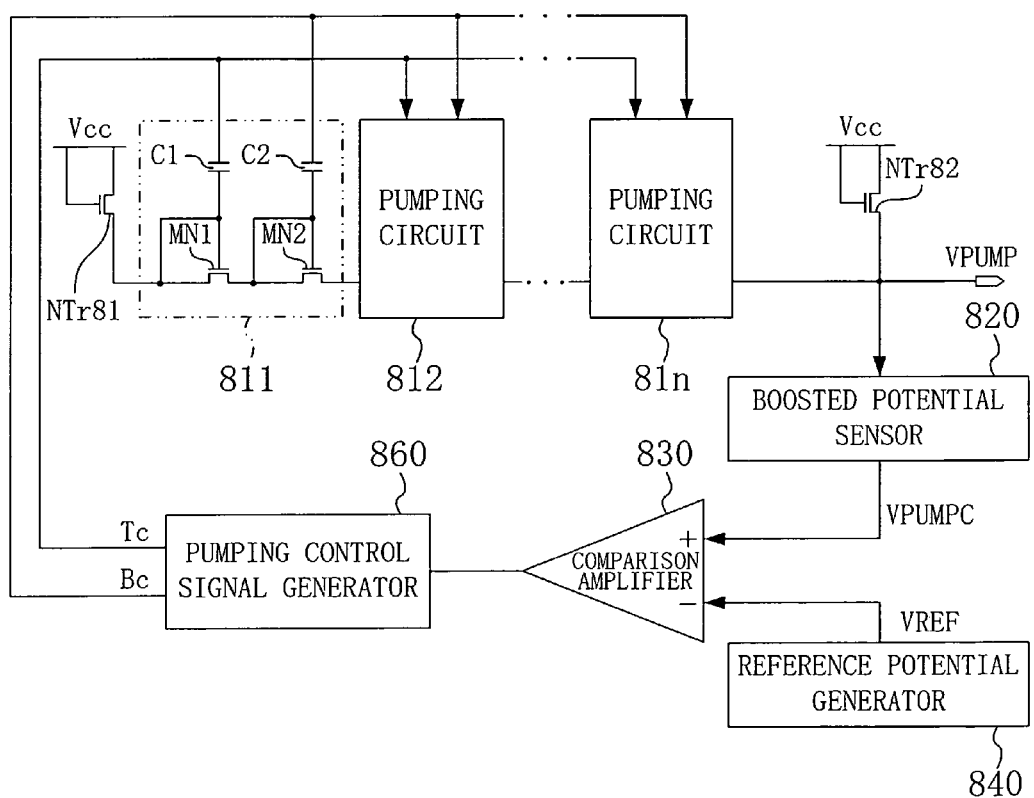
FIG. 20 is a diagram showing a configuration of a conventional booster circuit.
Figure 21:
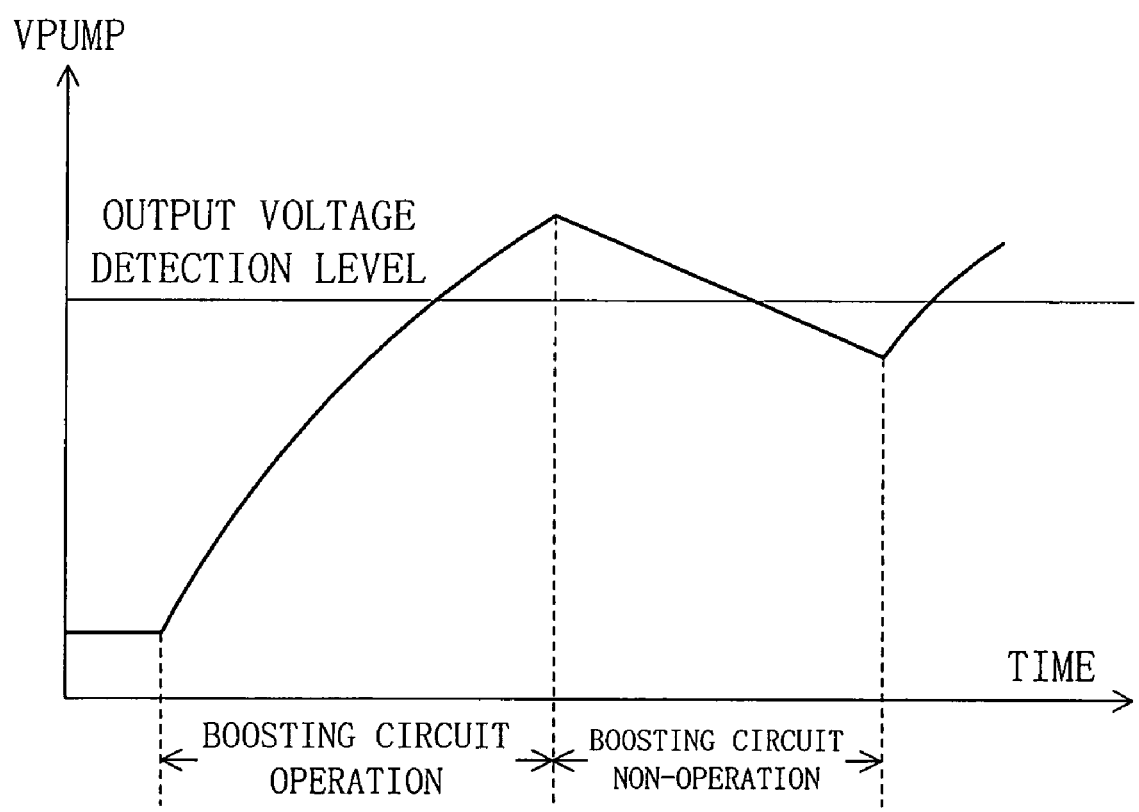
FIG. 21 is a graph showing boosting operation of the conventional booster circuit.

FIGS. 18A and 18B show examples of circuit configurations of the boosted voltage detection control circuit 60A and the power supply voltage detection control circuit 70A, respectively.

As shown in FIG. 18A, the boosted voltage detection control circuit 60A differs from the boosted voltage detection control circuit 60 shown in FIG. 12 in that the boosted voltage detection control circuit 60A includes a switching section 62 which is provided between the voltage comparator 61 and the output terminal and is constituted by AND circuits associated with n differential amplifiers (where n is an integer of one or more) constituting a voltage comparator 61.

Each of the AND circuits constituting the switching section 62 receives one of the boosting ability switching signals EN1 through ENn at one input terminal and receives the boosting ability switching enabling signal ENDET from the power supply voltage detection control circuit 70A at the other input terminal.

With this configuration, in a period in which the potential of the boosted voltage detection enabling signal ENDET is at a high level, if the potentials of respective nodes VPPD1 through VPPDn dividing the boosted voltage VPP by the resistors are lower than a reference voltage VREF, the boosted voltage detection control circuit 60A outputs the boosting ability switching signals EN1 through ENn associated with the respective nodes at low levels. On the contrary, if the potentials of the nodes are higher than the reference voltage VREF, the boosted voltage detection control circuit 60A outputs the boosting ability switching signals EN1 through ENn associated with the respective nodes at high levels.

On the other hand, in a period in which the potential of the boosting ability switching enabling signal ENDET is at a low level, the boosted voltage detection control circuit 60A outputs the potentials of all the boosting ability switching signals EN1 through ENn at low levels.

As shown in FIG. 18B, the power supply voltage detection control circuit 70A includes: resisters R1 and R2 connected in series between the power supply voltage VDD and a ground terminal; and a voltage comparator which has an input terminal connected to the connection node VDDE between the resistors R1 and R2 and another input terminal for receiving the reference voltage VREF and which compares the voltage at the connection node VDDE with the reference voltage VREF to output the boosting ability enabling signal ENDET. In this embodiment, a differential amplifier is used as the voltage comparator, the reference voltage VREF is applied to the inverted input terminal, and the voltage at the connection node VDDE is applied to the non-inverted input terminal. With this configuration, the boosting ability switching enabling signal ENDET is at a low level when the voltage at the connection node VDDE is lower than the reference voltage VREF, while being at a high level when the voltage at the connection node VDDE is higher than the reference voltage VREF.

Hereinafter, it will be described how the booster circuit having the aforementioned configuration operates with reference to FIG. 19 which shows voltage waveforms of the boosted voltage VPP output from the booster circuit.

As shown in FIG. 18B, when the power supply voltage VDD is a high power supply voltage higher than or equal to a given voltage determined by the reference voltage VREF and the resistance values of the resistors R1 and R2, the potential of the boosting ability switching enabling signal ENDET is at a high level.

This allows the boosted voltage detection control circuit 60A to output the boosting ability switching signals EN1 through ENn having high- or low-level values in accordance with the value of the boosted voltage VPP, as shown in FIG. 18A. Accordingly, as shown in FIG. 19, the boosting ability of the boosting section 10 is adjusted for every level of output voltage detection control.

On the other hand, when the power supply voltage is a low power supply voltage lower than the given voltage value, the potential of the boosting ability switching enabling signal ENDET is at a low level. Accordingly, the potentials of all the boosting ability switching signals EN1 through ENn output from the boosted voltage detection control circuit 60A which receives the low-level boosting ability switching enabling signal ENDET are at low levels, so that the boosting ability of the boosting section 10 is at the maximum. For example, as shown in FIG. 19, even when the boosting voltage VPP reaches output voltage detection control level 2, the boosting ability of the boosting section 10 is not reduced.

As described above, the booster circuit of the seventh embodiment includes the power supply voltage detection control circuit 70A for detecting the power supply voltage VDD and controlling the output of the boosted voltage detection control circuit 60A, so that the boosting ability of the boosting section 10 is adjusted in accordance with the voltage value of the power supply voltage VDD. Accordingly, even in the case of operating the booster circuit using a power supply voltage VDD with a wide bandwidth, overshoot of the output voltage VPP is prevented. In addition, the boosting ability of the boosting section 10 is not reduced too much even at a low power supply voltage. As a result, the reliability of components constituting the booster circuit is enhanced and, in addition, even if the power supply voltage VDD is relatively low, a delay in a setup time is prevented.

The boosting section 10 is not limited to the configuration described in the first embodiment. Alternatively, the boosting section 10A or 10B of the second or third embodiment may be used.

What is claimed is:

1. A booster circuit comprising:
   a boosting section including one or a plurality of serially-connected boosting cells for boosting an input voltage in response to a clock signal and outputting the boosted voltage, each of the boosting cells including a charge transfer transistor, and a plurality of boosting capacitors connected in parallel;
   a boosted voltage detector for detecting the boosted voltage output from the boosting section and, when the detected boosted voltaae is lower than or equal to a given voltage value, outputting a detection signal;
   a clock generator for outputting the clock signal in response to the detection signal, wherein the boosting section includes a connection switching circuit for switching connections to the plurality of boosting capacitors based on a control signal;

a boosted voltage detection control section for detecting the output voltage from the boosting section and outputting the control signal; and a power supply voltage detection control section for detecting a power supply voltage and controlling the output of the boosted voltage detection control section.

* * * * *